(12) United States Patent
Kuwashiro

(10) Patent No.: US 9,261,681 B2
(45) Date of Patent: Feb. 16, 2016

(54) ZOOM LENS AND IMAGE PICKUP APPARATUS INCLUDING THE SAME

(71) Applicant: CANON KABUSHIKI KAISHA, Tokyo (JP)

(72) Inventor: Shin Kuwashiro, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 13/949,481

(22) Filed: Jul. 24, 2013

(65) Prior Publication Data

US 2014/0029110 A1    Jan. 30, 2014

(30) Foreign Application Priority Data

Jul. 26, 2012   (JP) .................. 2012-165635

(51) Int. Cl.
*G02B 15/177* (2006.01)
*G02B 15/14* (2006.01)

(52) U.S. Cl.
CPC .............. *G02B 15/14* (2013.01); *G02B 15/177* (2013.01)

(58) Field of Classification Search
CPC ...... G02B 13/009; G02B 15/00; G02B 15/14; G02B 15/20; G02B 15/22; G02B 15/177
USPC ............ 359/676, 682, 686, 753; 348/207.99, 348/240.99–240.3, 335–369; 396/72–88
See application file for complete search history.

(56) References Cited

U.S. PATENT DOCUMENTS

2010/0202064 A1 *   8/2010   Nagaoka ................. 359/686

FOREIGN PATENT DOCUMENTS

| JP | 2007072263 A | 3/2007 |
|----|--------------|--------|
| JP | 2010054722 A | 3/2010 |
| JP | 2010181787 A | 8/2010 |

* cited by examiner

*Primary Examiner* — Ricky Mack
*Assistant Examiner* — Gary O'Neill
(74) *Attorney, Agent, or Firm* — Canon USA Inc., IP Division

(57) ABSTRACT

A zoom lens includes, in order from an object side to an image side, first to fourth lens units having negative, positive, negative, and positive refractive power, respectively. During zooming from a wide-angle end to a telephoto end, at least the first, second, and third lens units move. The focal lengths of the first, second, and third lens units, the amount of movement of the second lens unit during zooming from the wide-angle end to the telephoto end, a lateral magnification at the wide-angle end of the second lens unit, a lateral magnification at the wide-angle end of the third lens unit, a lateral magnification at the telephoto end of the second lens unit, and the lateral magnification at the telephoto end of the third lens unit are appropriately set.

11 Claims, 21 Drawing Sheets

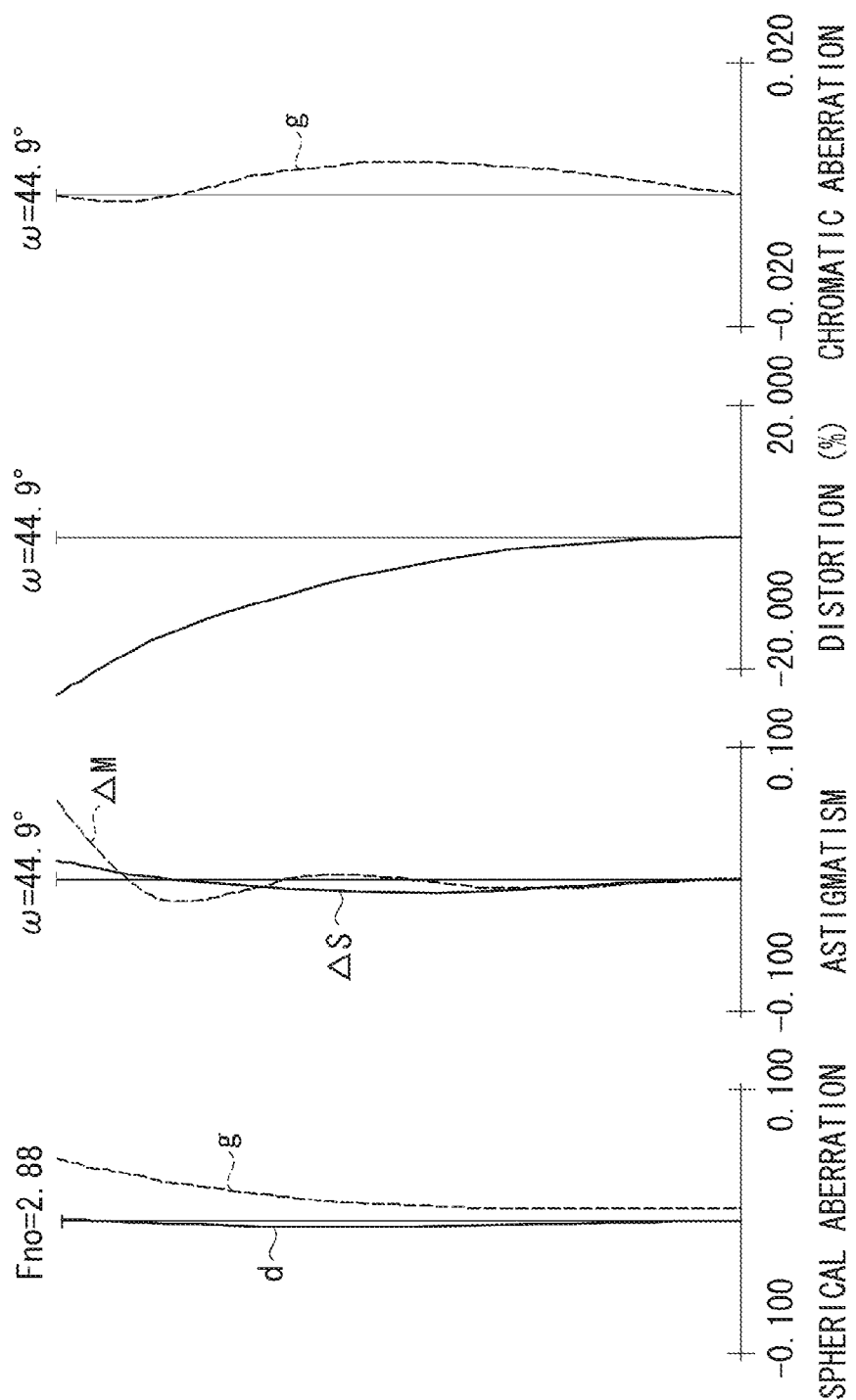

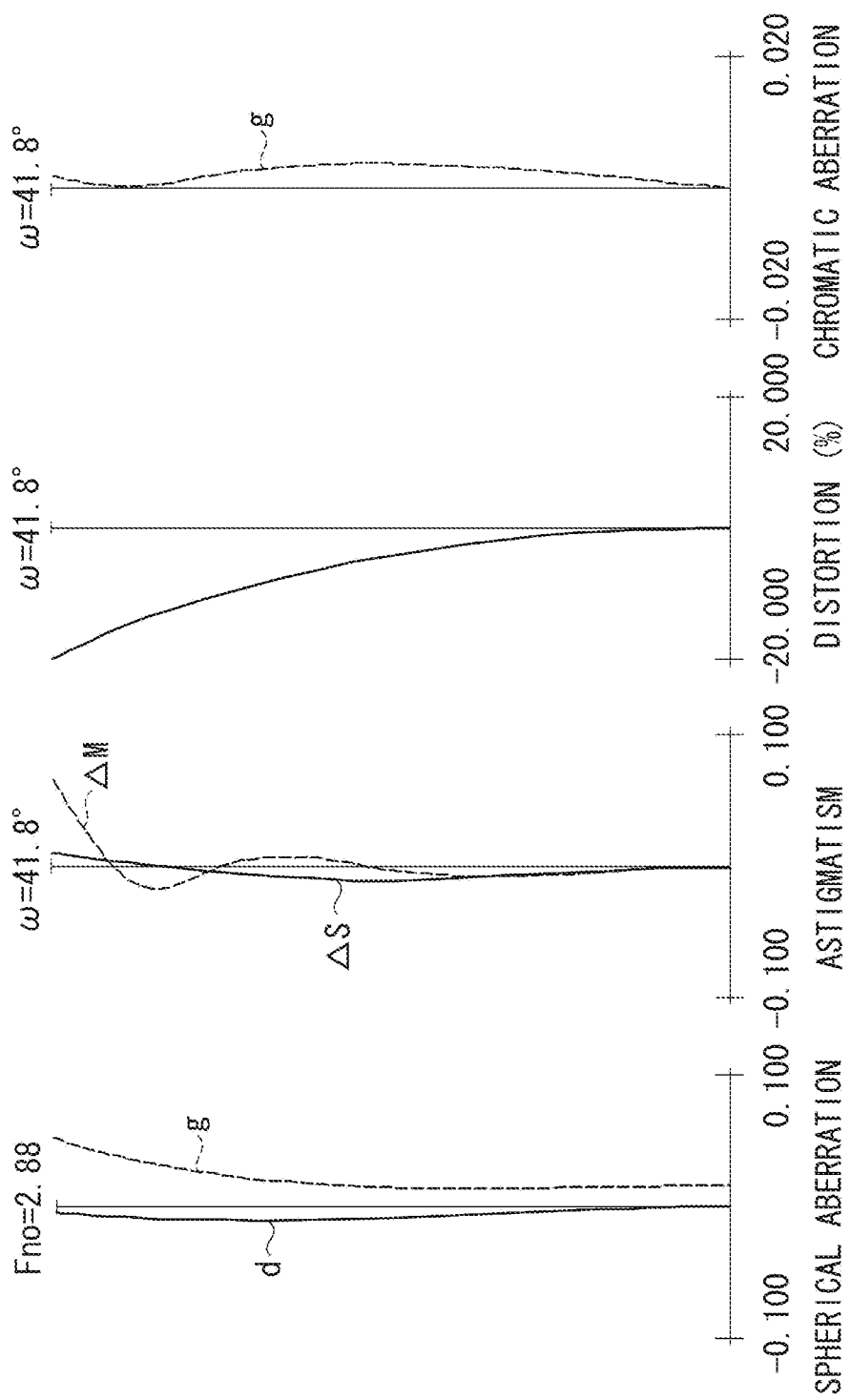

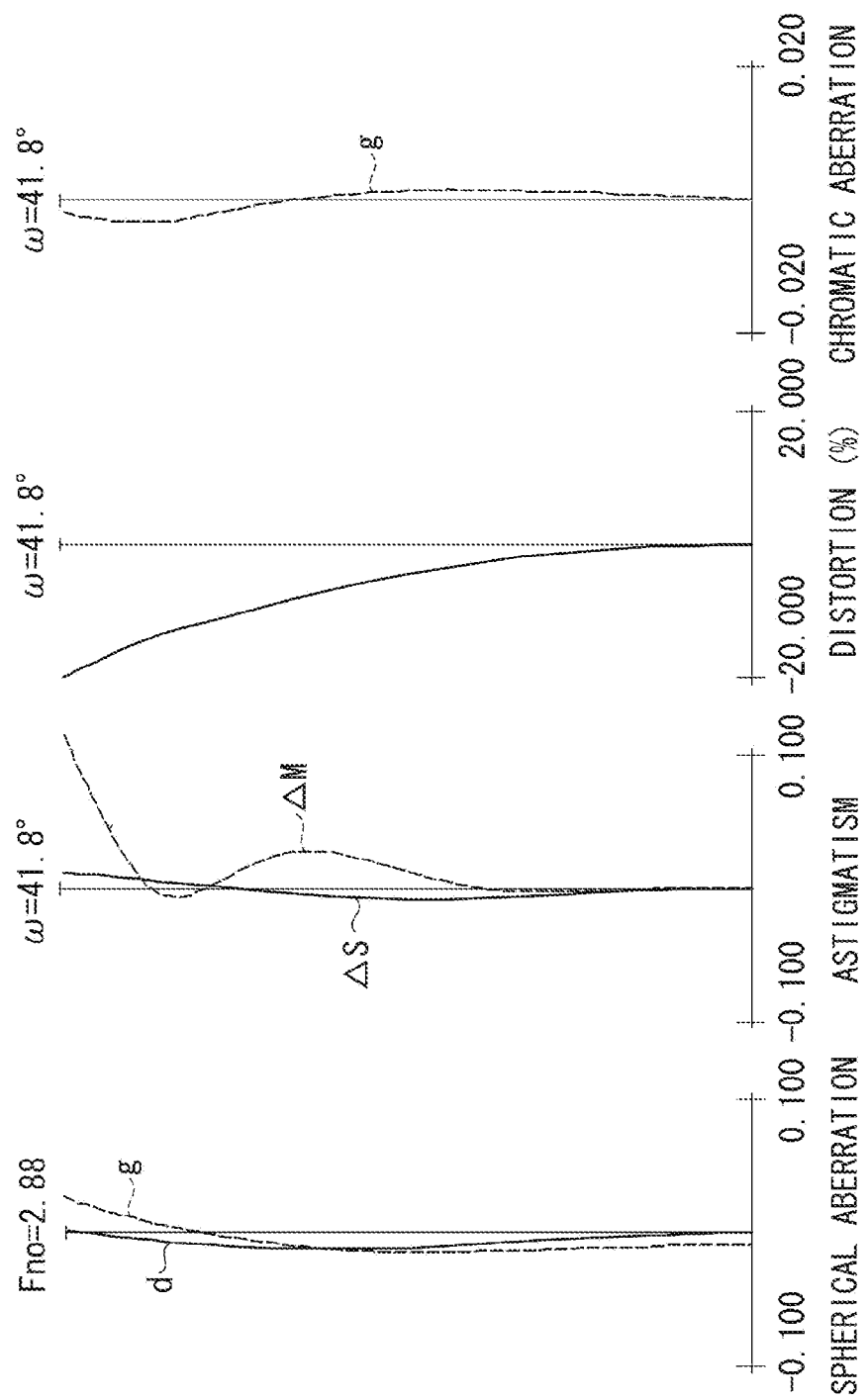

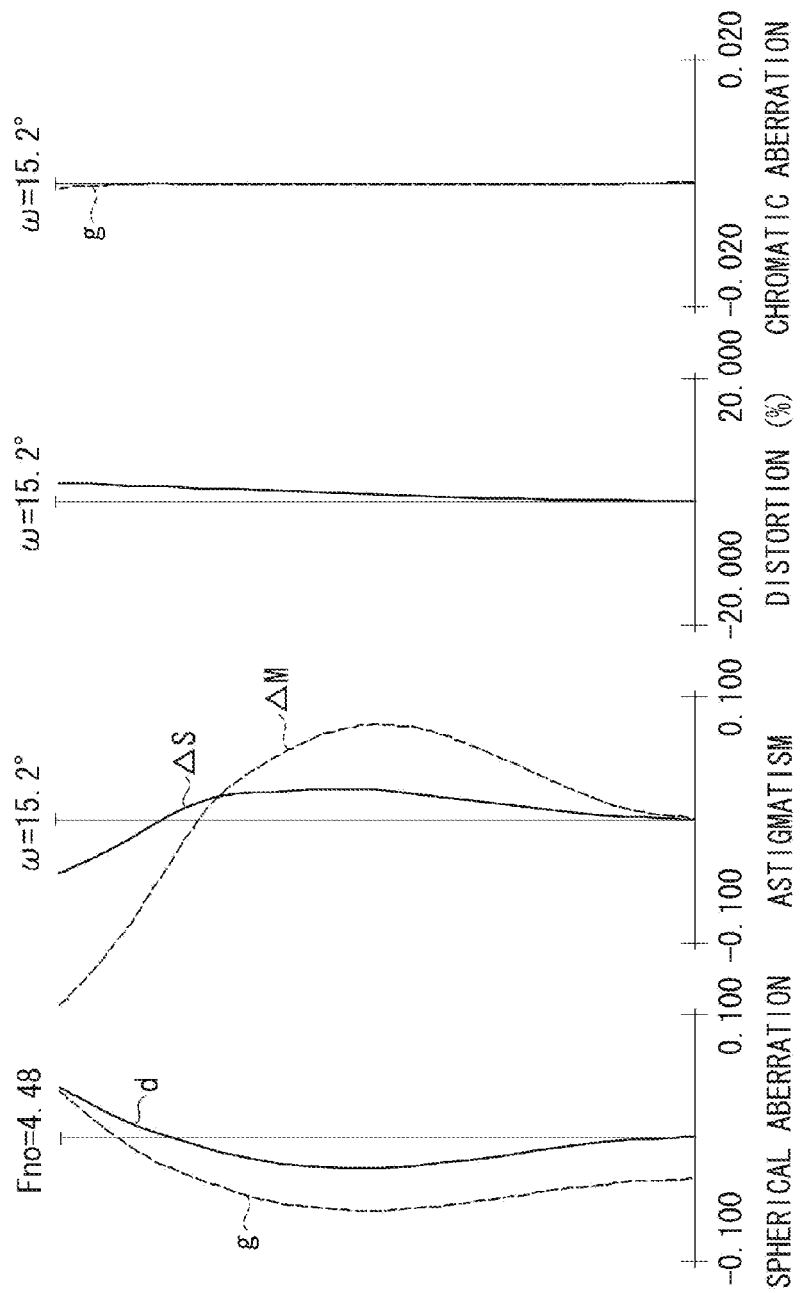

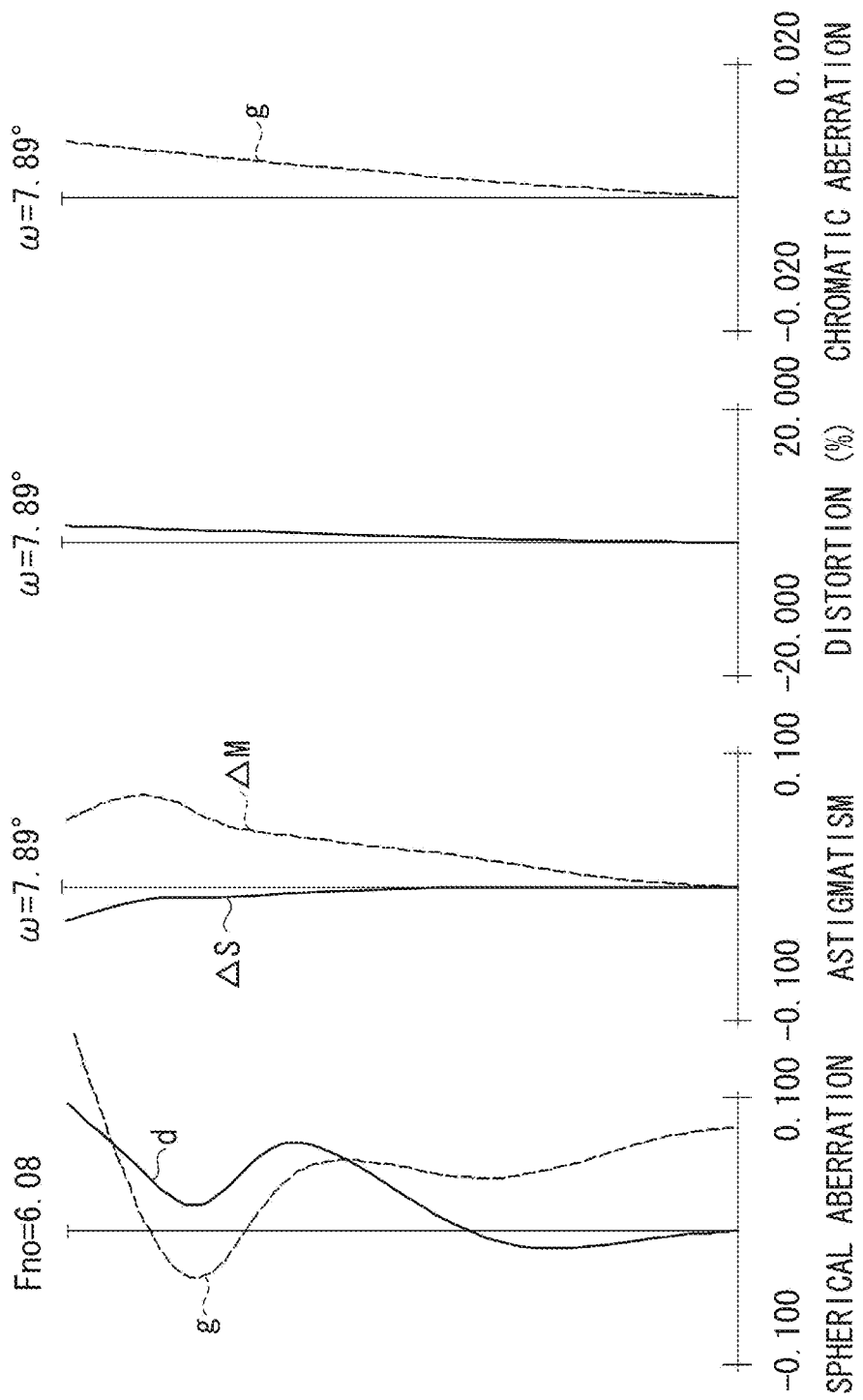

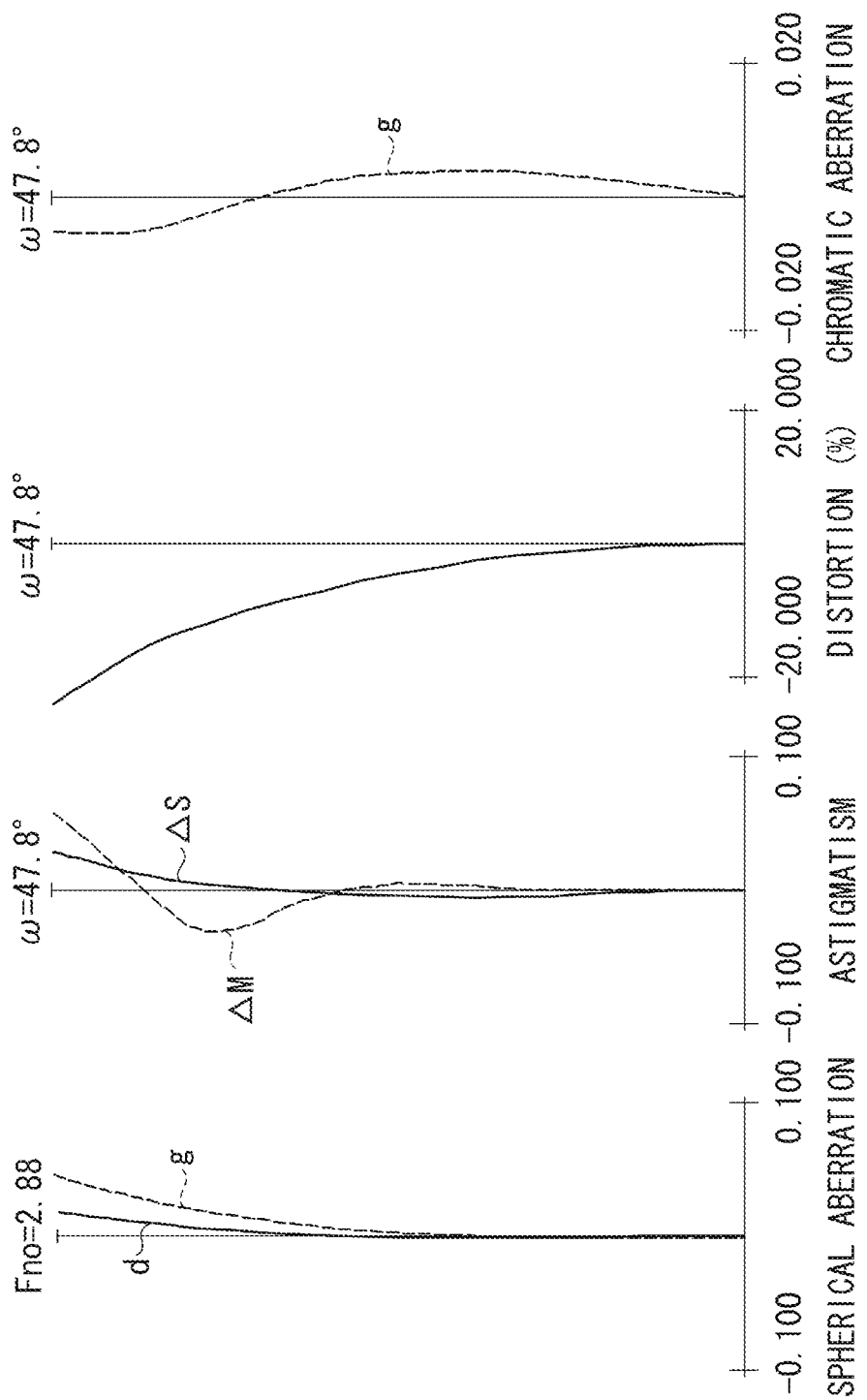

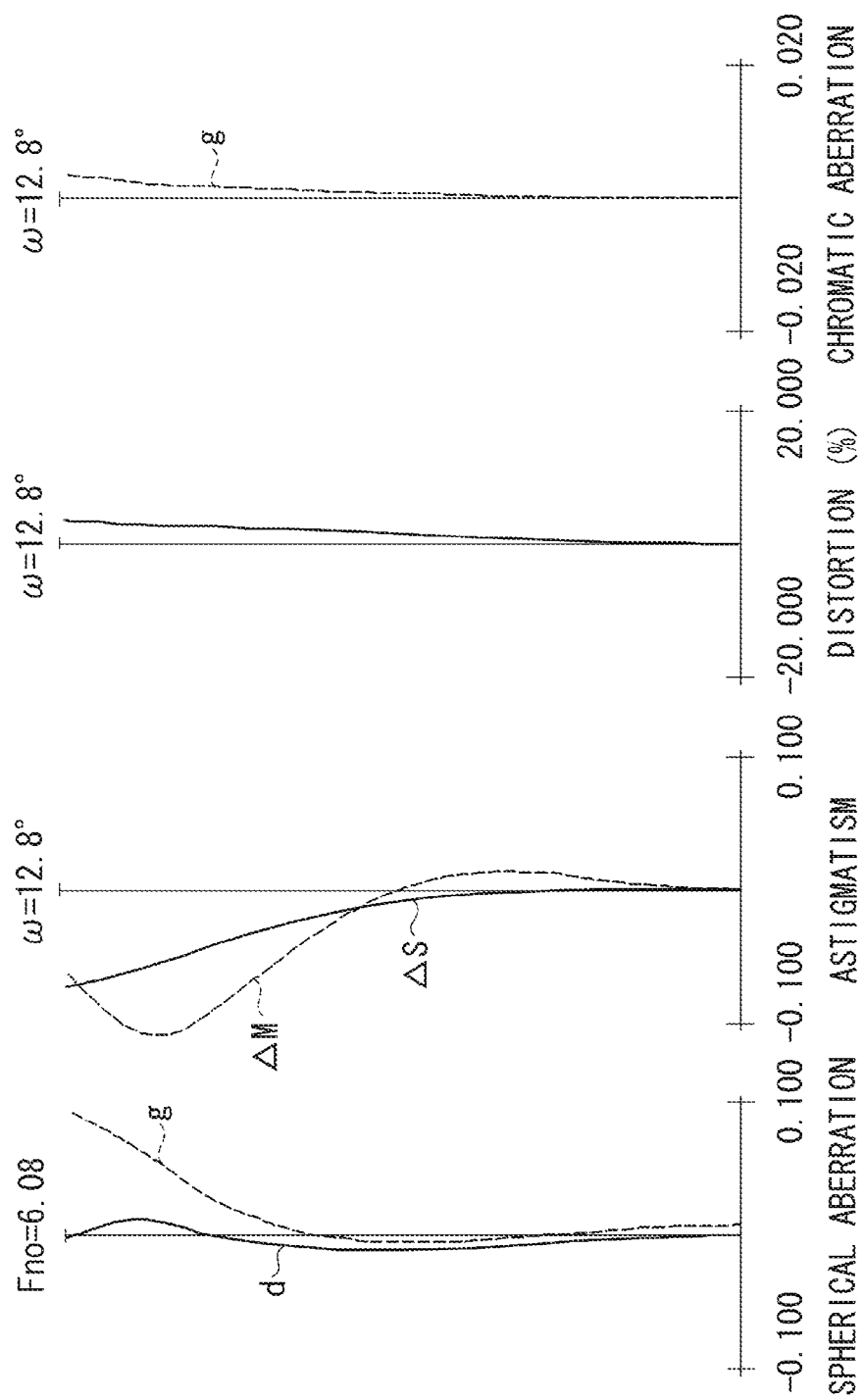

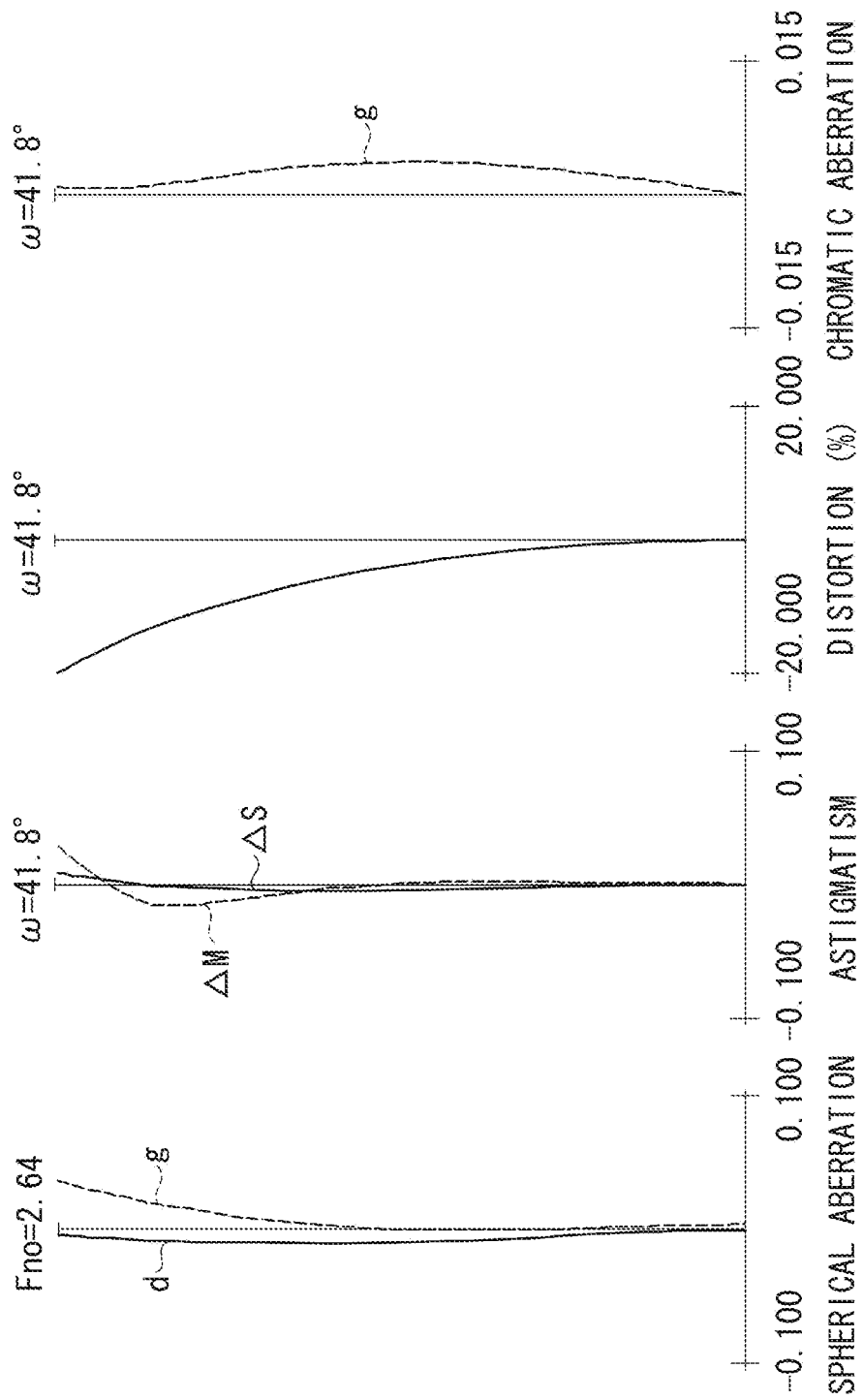

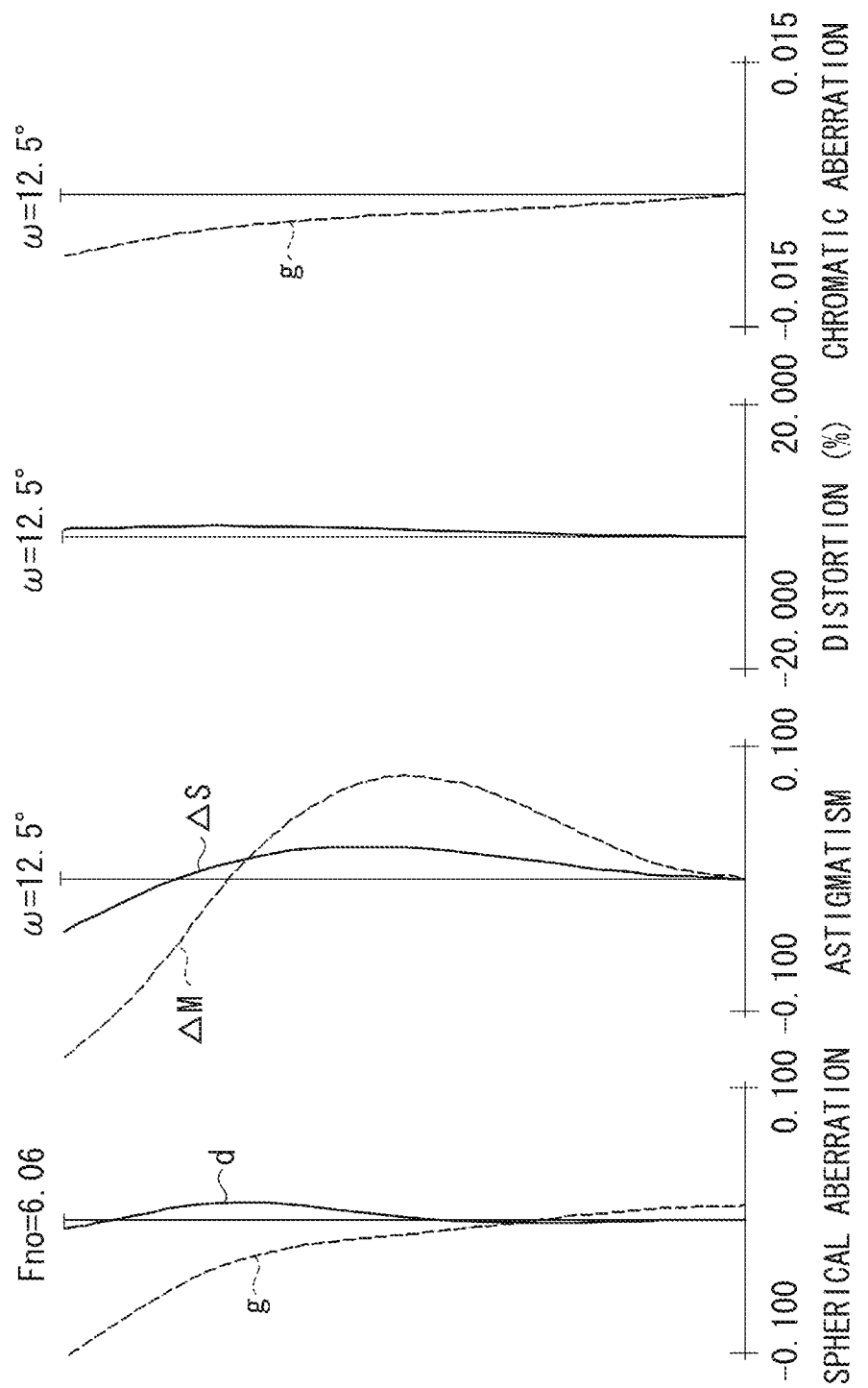

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens. The zoom lens may be particularly suitable for use in an image pickup apparatus such as a digital still camera, a video camera, a monitoring camera, a broadcasting camera, and a film camera.

2. Description of the Related Art

The zoom lens used for an image pickup apparatus equipped with a solid-state image sensor, such as a digital still camera, a video camera, and a monitoring camera, is required to have the entire zoom lens being compact with a wide angle of view, a high zoom ratio, and high optical performance.

As an example of a zoom lens for addressing the abovementioned requirements, Japanese Patent Applications Laid-Open Nos. 2010-181787, 2010-54722, and 2007-72263 discuss a four-unit zoom lens including four lens units having negative, positive, negative, and positive refractive power, respectively, in order from an object side to an image side.

The zoom lens discussed in Japanese Patent Application Laid-Open No. 2010-181787 has a focal length of 25.5 mm at the wide-angle end converted for a 35 mm silver-halide camera and a zoom ratio of around 6.7. The zoom lens discussed in Japanese Patent Application Laid-Open No. 2010-54722 has a focal length of 21.0 mm at the wide-angle end converted for a 35 mm silver-halide camera and a zoom ratio of around 4.8. The zoom lens discussed in Japanese Patent Application Laid-Open No. 2007-72263 has the focal length of 34.5 mm at the wide-angle end converted for a 35 mm silver-halide camera and a zoom ratio of around 2.9.

In order to realize a wide angle of view in a negative lead type zoom lens, in which a lens unit closest to the object side has negative refractive power, the front lens diameter increases. In addition, to realize a high zoom ratio, the amount of movement needs to be increased in each lens unit, which accordingly increases the total lens length.

In order to realize a wide angle of view and a high zoom ratio while reducing the total lens length, the refractive power of each lens unit may be increased to reduce the number of lenses in each lens unit. However, the resulting zoom lens has a large variation of aberration caused by zooming, and accordingly, it becomes difficult to obtain high optical performance for the entire zooming range.

In order to realize a negative lead type zoom lens of compact size with a wide angle of view, a high zoom ratio, and high optical performance, it is necessary to set the refractive power and the lens configuration of each lens unit appropriately.

Here, the zoom lenses discussed in Japanese Patent Application Laid-Open Nos. 2010-181787, 2010-54722, and 2007-72263 do not sufficiently realize both of the wide angle of view and high zoom ratio.

SUMMARY OF THE INVENTION

According to an aspect of the present invention, a zoom lens includes, in order from an object side to an image side, a first lens unit having negative refractive power, a second lens unit having positive refractive power, a third lens unit having negative refractive power, and a fourth lens unit having positive refractive power. During zooming from a wide-angle end to a telephoto end, at least the first lens unit, the second lens unit, and the third lens unit move. When a focal length of the first lens unit is denoted by f1, a focal length of the second lens unit is denoted by f2, a focal length of the third lens unit is denoted by f3, an amount of movement of the second lens unit during zooming from the wide-angle end to the telephoto end is denoted by M2, a lateral magnification at the wide-angle end of the second lens unit is denoted by β2w, a lateral magnification at the wide-angle end of the third lens unit is denoted by β3w, a lateral magnification at the telephoto end of the second lens unit is denoted by β2t, and a lateral magnification at the telephoto end of the third lens unit is denoted by β3t, the following conditions are satisfied:

$$0.08 < |f1|/|f3| < 0.35$$

$$0.10 < f2/M2 < 0.64$$

$$1.80 < (\beta 2t/\beta 2w)/(\beta 3t/\beta 3w) < 3.70.$$

Further features of the present invention will become apparent from the following description of exemplary embodiments with reference to the attached drawings.

BRIEF DESCRIPTION OF THE DRAWINGS

FIGS. 2A, 2B, and 2C are aberration diagrams at the wide-angle end, a middle zoom position, and a telephoto end of the zoom lens according to the first exemplary embodiment, respectively.

FIGS. 4A, 4B, and 4C are aberration diagrams at the wide-angle end, a middle zoom position, and a telephoto end of the zoom lens according to the second exemplary embodiment, respectively.

FIGS. 6A, 6B, and 6C are aberration diagrams at the wide-angle end, a middle zoom position, and a telephoto end of the zoom lens according to the third exemplary embodiment, respectively.

FIGS. 8A, 8B, and 8C are aberration diagrams at the wide-angle end, a middle zoom position, and a telephoto end of the zoom lens according to the fourth exemplary embodiment, respectively.

FIGS. 10A, 10B, and 10C are aberration diagrams at the wide-angle end, a middle zoom position, and a telephoto end of the zoom lens according to the fifth exemplary embodiment, respectively.

DESCRIPTION OF THE EMBODIMENTS

A zoom lens and an image pickup apparatus including the zoom lens according to exemplary embodiments of the present invention will be described below. The zoom lens according to the exemplary embodiments of the present invention includes, in order from an object side to an image side, a first lens unit having negative refractive power, a second lens unit having positive refractive power, a third lens unit having negative refractive power, and a fourth lens unit having positive refractive power.

In a first exemplary embodiment, during zooming from the wide-angle end to the telephoto end, the first lens unit moves along a locus convex toward the image side, and the second lens unit and the third lens unit move toward the object side. The fourth lens unit moves along a locus convex toward the image side and then moves along a locus convex toward the object side.

In second and third exemplary embodiments, during zooming from the wide-angle end toward the telephoto end, the first lens unit and the third lens unit each move along a locus convex toward the image side, the second lens unit moves toward the object side, and the fourth lens unit moves toward the image side.

In a fourth exemplary embodiment, during zooming from the wide-angle end to the telephoto end, the first lens unit moves along a locus convex toward the image side, and the second lens unit and the third lens unit move toward the object side. The fourth lens unit moves toward the image side.

In a fifth exemplary embodiment, during zooming from the wide-angle end to the telephoto end, the first lens unit moves along a locus convex toward the image side, the second lens unit and the third lens unit move toward the object side, and the fourth lens unit does not move.

Figure 1:
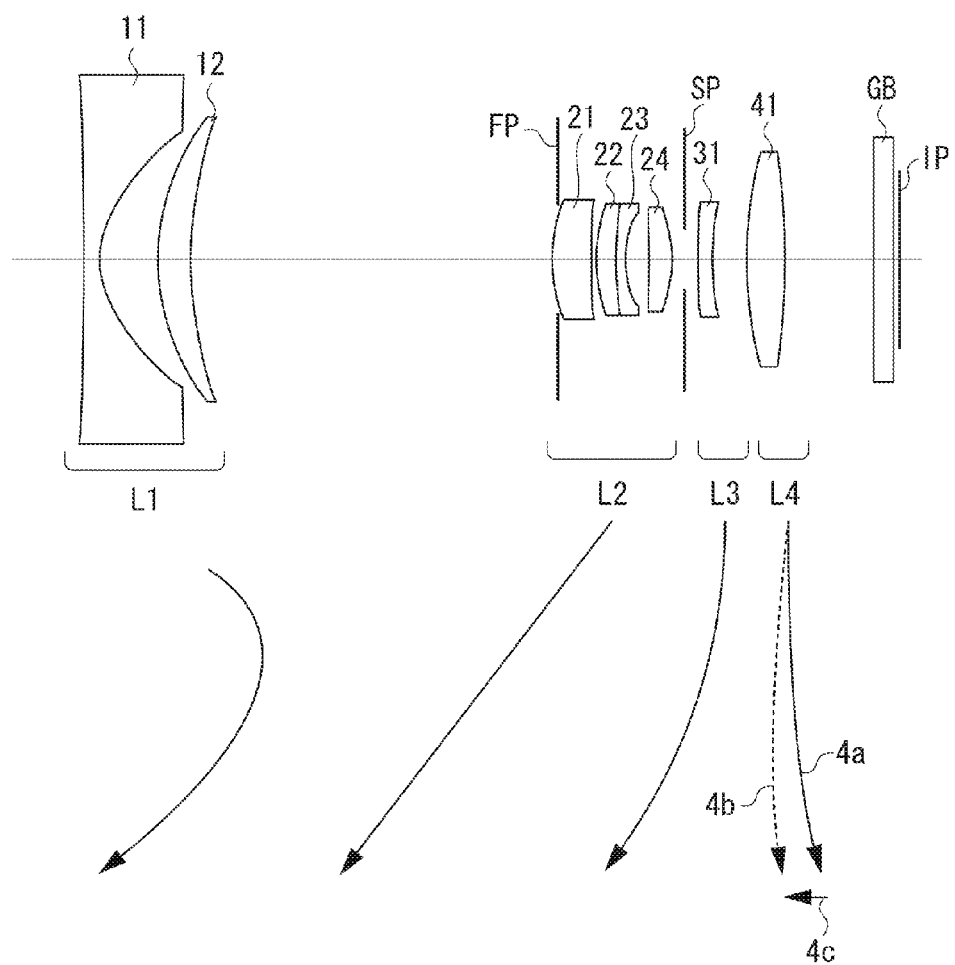
FIG. 1 is a lens cross-sectional view at a wide-angle end of a zoom lens according to a first exemplary embodiment.
Figure 2B:
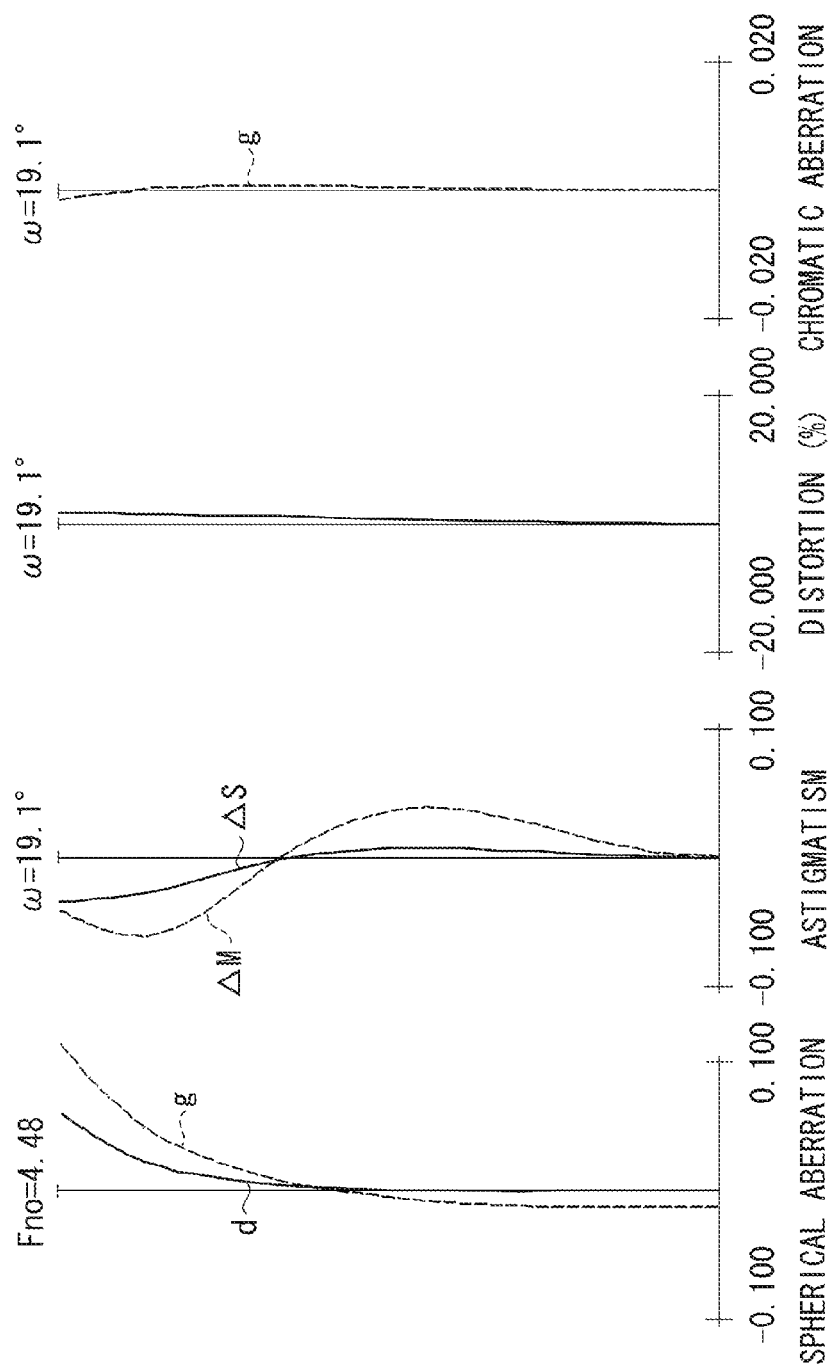
Figure 2C:
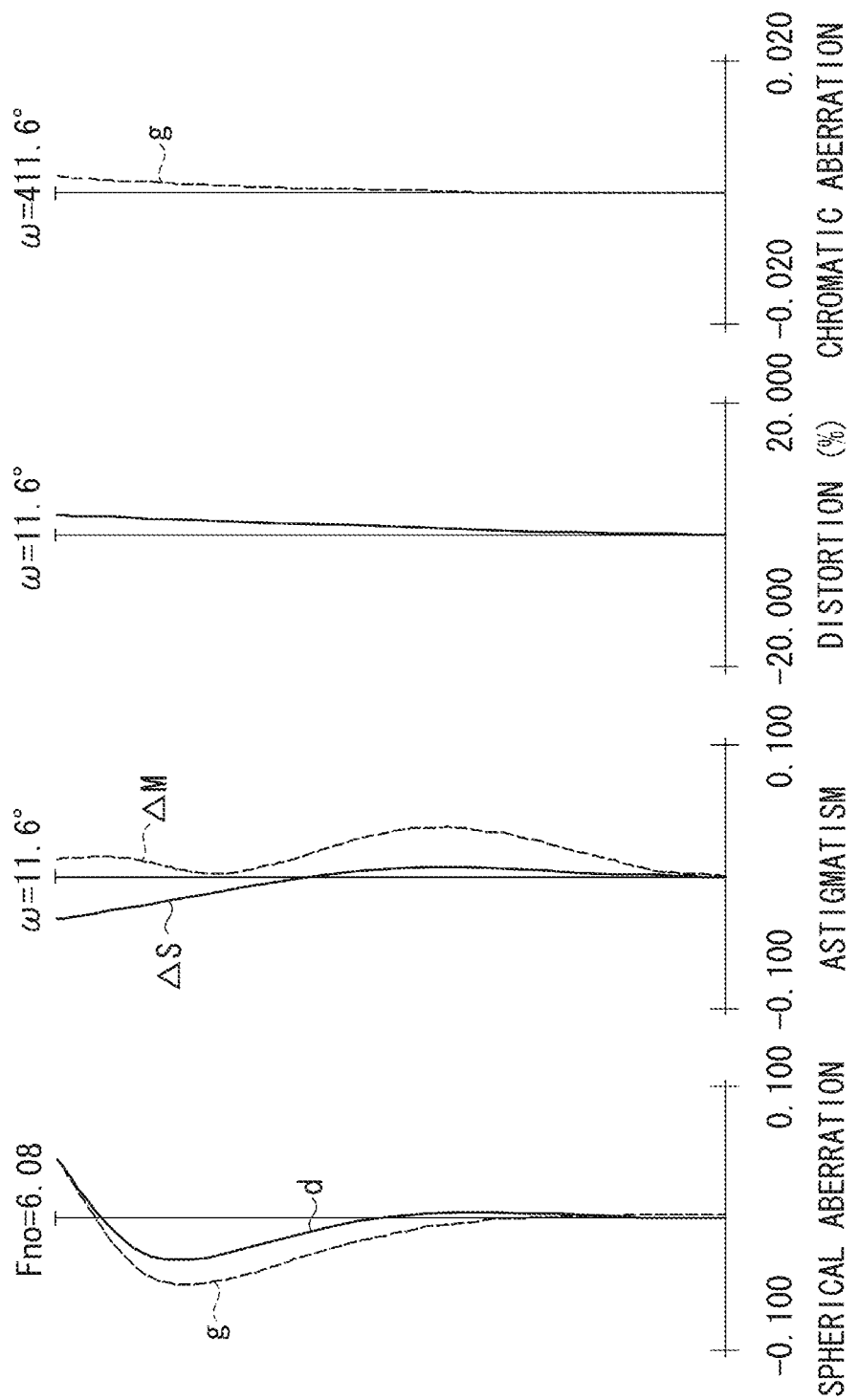
Figure 3:
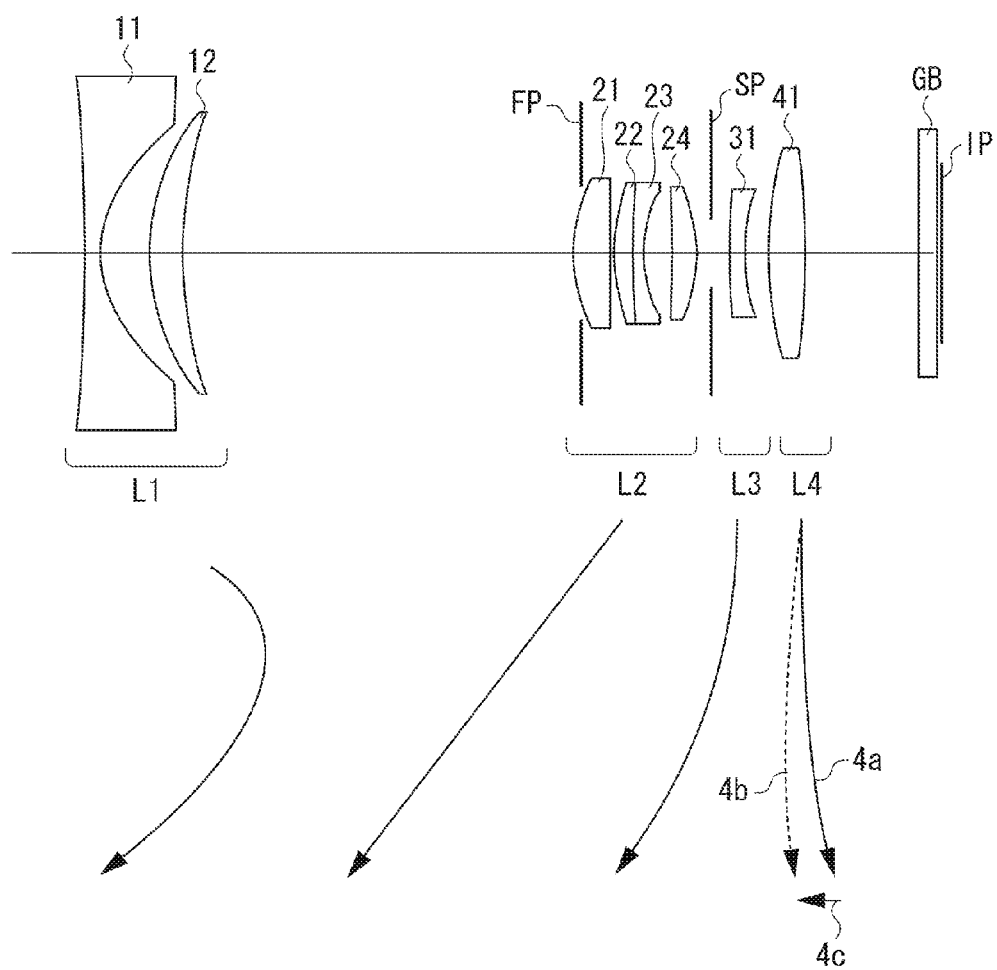
FIG. 3 is a lens cross-sectional view at a wide-angle end of a zoom lens according to a second exemplary embodiment.
Figure 4B:
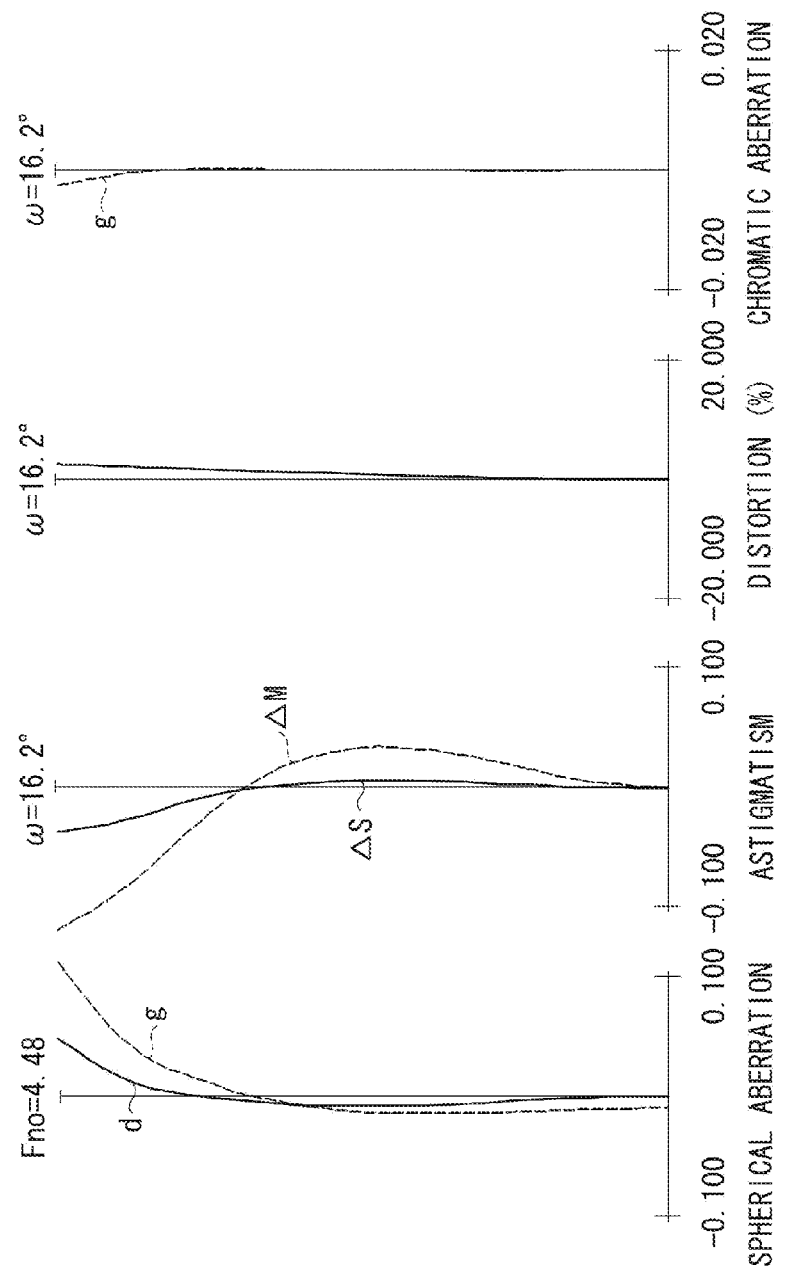
Figure 4C:
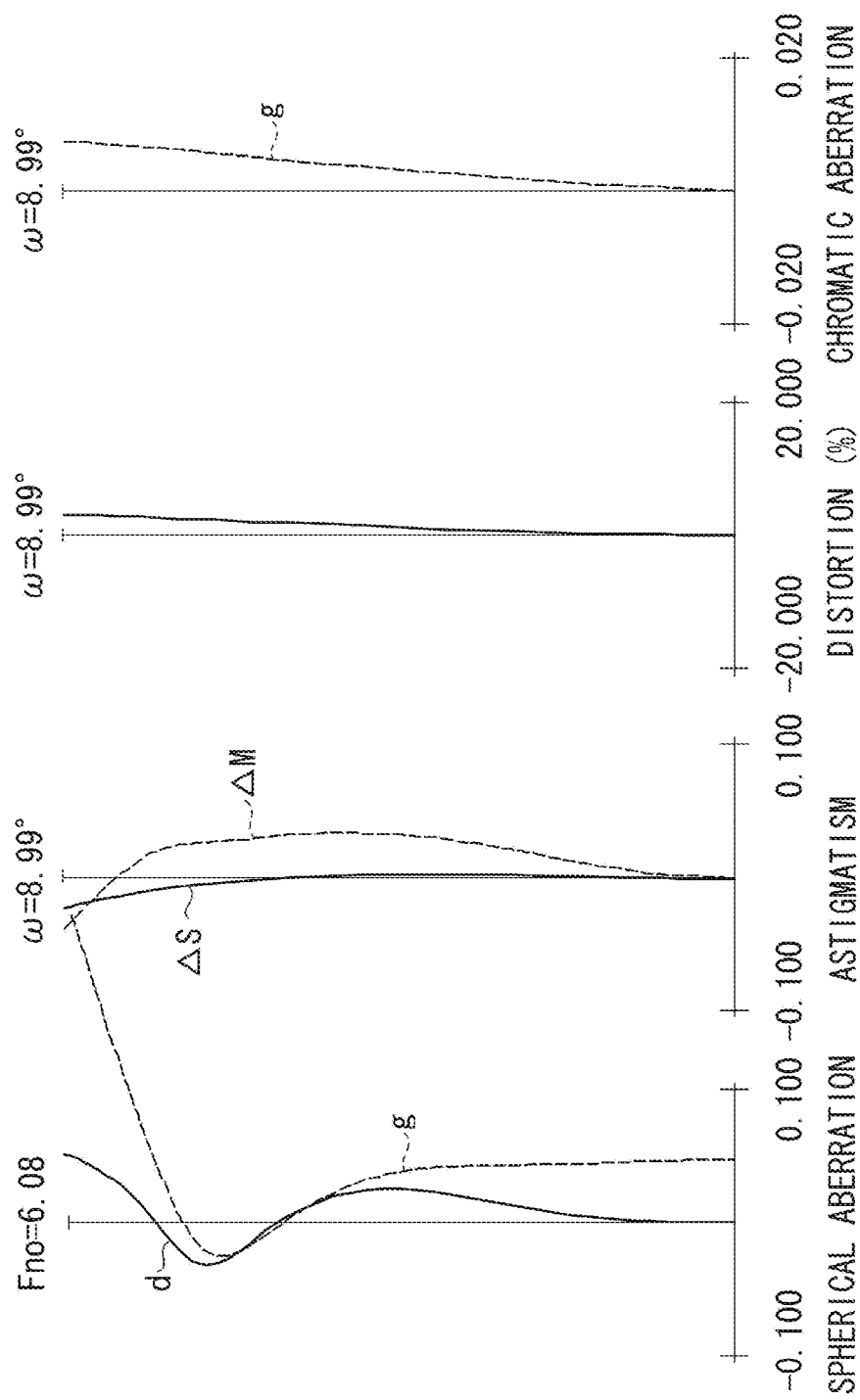

FIG. 1 is a lens cross-sectional view at the wide-angle end of the zoom lens according to the first exemplary embodiment. FIGS. 2A, 2B, and 2C are aberration diagrams at the wide-angle end, the middle zoom position, and the telephoto end of the zoom lens according to the first exemplary embodiment, respectively. The first exemplary embodiment is a zoom lens having a zoom ratio of 5.68 and an aperture ratio of about 2.88 to 6.08. FIG. 3 is a lens cross-sectional view at the wide-angle end of the zoom lens according to the second exemplary embodiment. FIGS. 4A, 4B, and 4C are aberration diagrams at the wide-angle end, the middle zoom position, and the telephoto end of the zoom lens according to the second exemplary embodiment, respectively. The second exemplary embodiment is a zoom lens having a zoom ratio of 6.64 and an aperture ratio of about 2.88 to 6.08.

Figure 5:
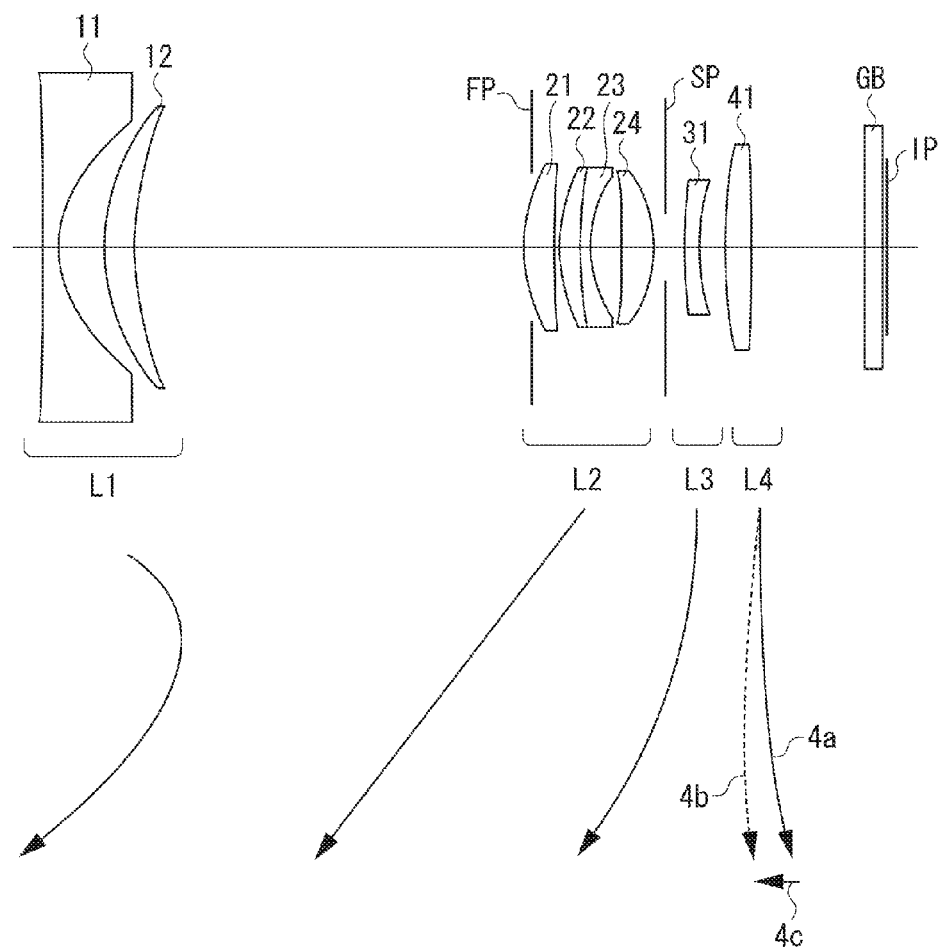
FIG. 5 is a lens cross-sectional view at a wide-angle end of a zoom lens according to a third exemplary embodiment.
Figure 7:
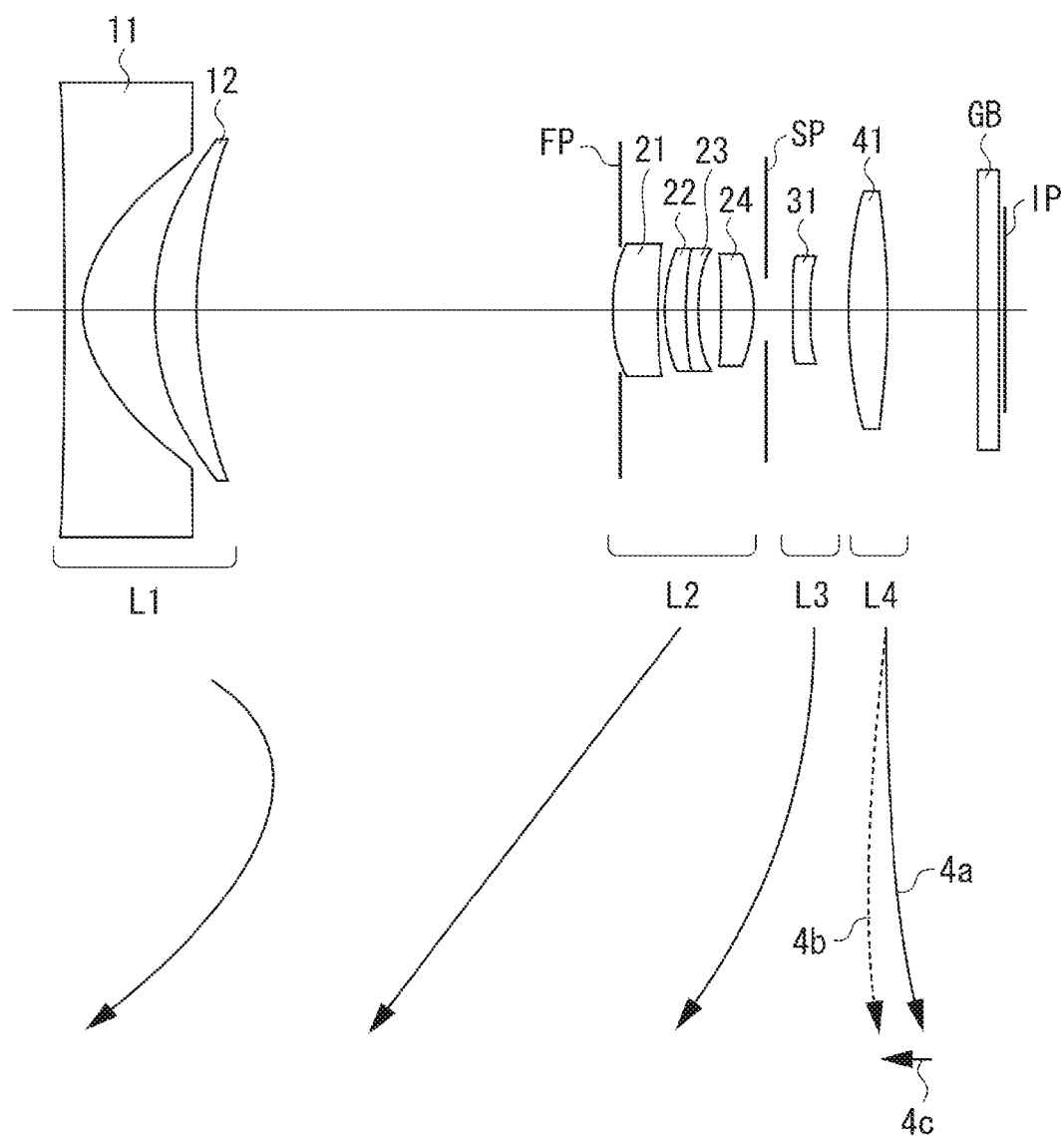
FIG. 7 is a lens cross-sectional view at a wide-angle end of a zoom lens according to a fourth exemplary embodiment.
Figure 8B:
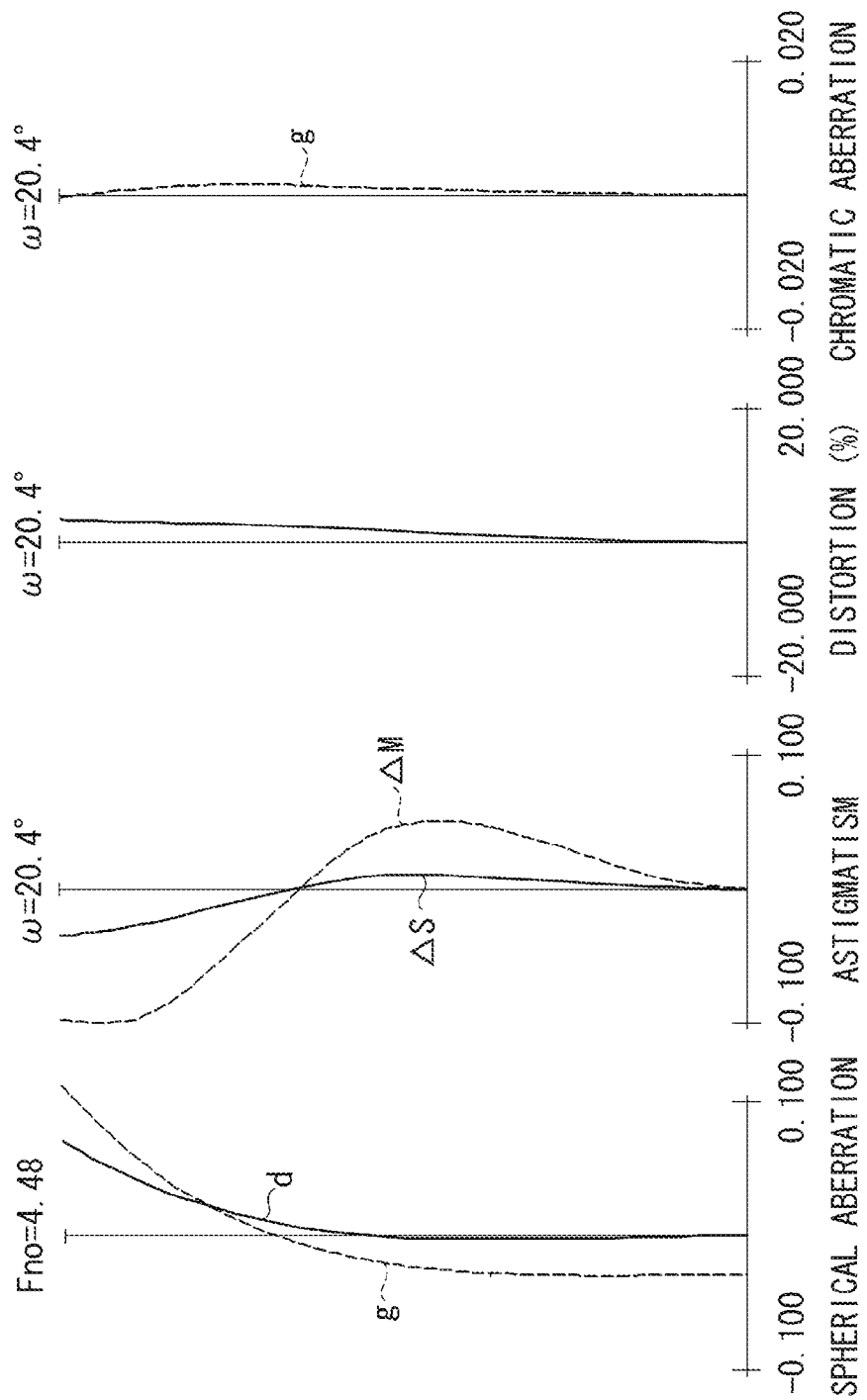

FIG. 5 is a lens cross-sectional view at the wide-angle end of the zoom lens according to the third exemplary embodiment. FIGS. 6A, 6B, and 6C are aberration diagrams at the wide-angle end, the middle zoom position, and the telephoto end of the zoom lens according to the third exemplary embodiment, respectively. The third exemplary embodiment is a zoom lens having a zoom ratio of 7.59 and an aperture ratio of about 2.88 to 6.08. FIG. 7 is a lens cross-sectional view at the wide-angle end of the zoom lens according to the fourth exemplary embodiment. FIGS. 8A, 8B, and 8C are aberration diagrams at the wide-angle end, the middle zoom position, and the telephoto end of the zoom lens according to the fourth exemplary embodiment, respectively. The fourth exemplary embodiment is a zoom lens having a zoom ratio of 5.68 and an aperture ratio of about 2.88 to 6.08.

Figure 9:
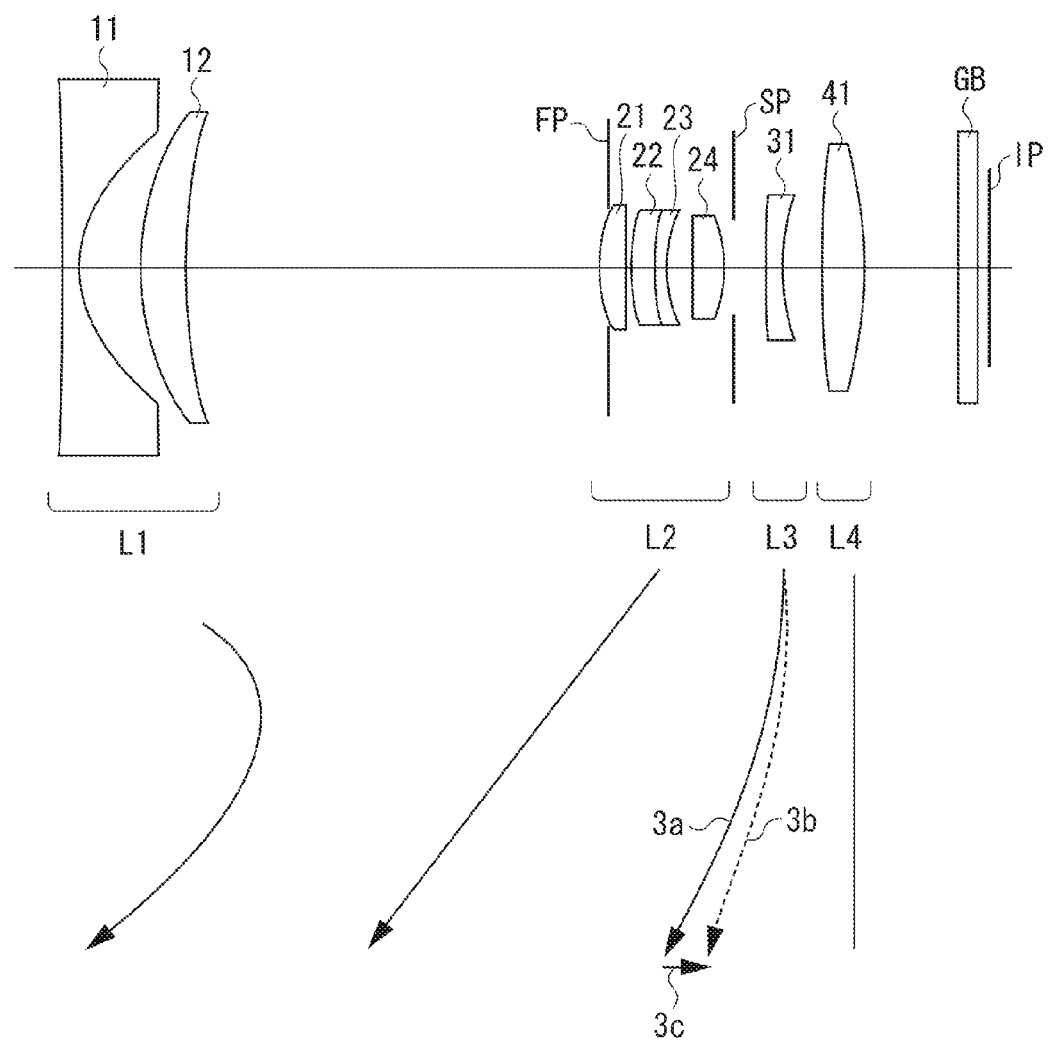
FIG. 9 is a lens cross-sectional view at a wide-angle end of a zoom lens according to a fifth exemplary embodiment.
Figure 10B:
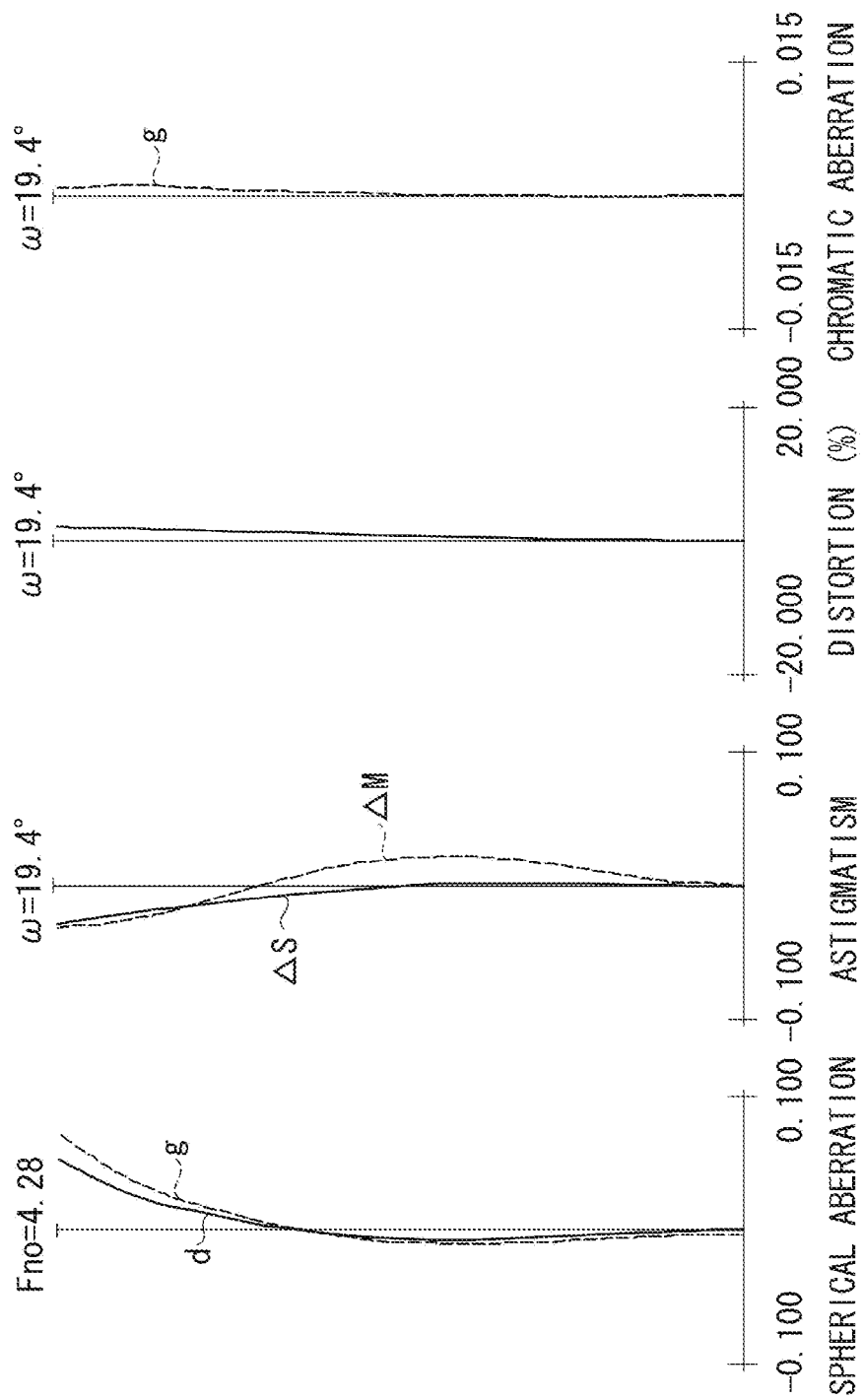

FIG. 9 is a lens cross-sectional view at the wide-angle end of the zoom lens according to the fifth exemplary embodiment. FIGS. 10A, 10B, and 10C are aberration diagrams at the wide-angle end, the middle zoom position, and the telephoto end of the zoom lens according to the fifth exemplary embodiment, respectively. The fifth exemplary embodiment is a zoom lens having a zoom ratio of 4.74 and an aperture ratio of about 2.64 to 6.06.

Figure 11:
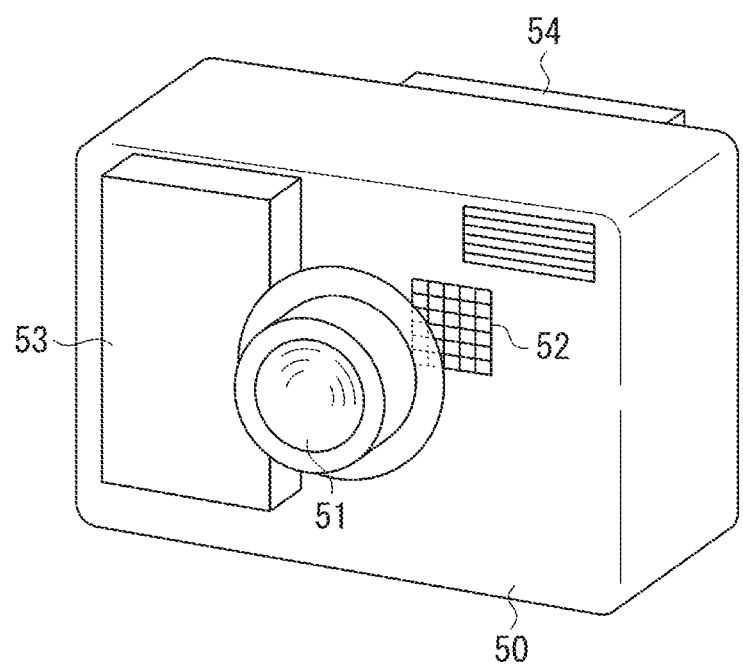
FIG. 11 is a schematic diagram of main components of an image pickup apparatus according to an exemplary embodiment of the present invention.

FIG. 11 is a schematic diagram of main components of a digital still camera (image pickup apparatus) including the zoom lens according to the exemplary embodiments of the present invention. The zoom lens of each exemplary embodiment is an imaging optical system used for an image pickup apparatus such as a digital still camera, a video camera, a silver-halide film camera, and a television camera. In the lens cross-sectional view, the left hand side is the object side and the right hand side is the image side. Further, in the lens cross-sectional view, Li denotes the i-th lens unit where i is the order of the lens unit from the object side.

The zoom lens of each exemplary embodiment is a negative lead type zoom lens including, in order from the object side to the image side, a first lens unit L1 having negative refractive power, a second lens unit L2 having positive refractive power, a third lens unit L3 having negative refractive power, and a fourth lens unit L4 having positive refractive power.

Each exemplary embodiment has an optical block G corresponding to an optical filter, a face plate, a low-pass filter, and an infrared cut filter, and an image plane IP. When the zoom lens is used as an imaging optical system for a digital still camera or a video camera, the image plane IP corresponds to a solid-state image sensor (photoelectric conversion element) such as a charge-coupled device (CCD) sensor or a complementary metal-oxide semiconductor (CMOS) sensor. When the zoom lens is used as an imaging optical system for a silver-halide film camera, the image plane IP corresponds to a film surface. The arrows in the lens cross-sectional view denote moving loci of the respective lens units during zooming.

In the spherical aberration diagrams, Fno denotes the F-number. The solid-line indicates the d-line (wavelength of 587.6 nm) and the dotted line indicates the g-line (wavelength of 435.8 nm). In the astigmatism diagrams, the solid line indicates a sagittal image plane at the d-line and the dotted line indicates a meridional image plane at the d-line. Distortion is indicated at the d-line. Chromatic aberration of magnification (lateral chromatic aberration) diagrams illustrate the aberration at the g-line relative to the d-line. The diagrams illustrate an imaging half angle of view ω. Meanwhile, the wide-angle end and the telephoto end of each exemplary embodiment are respectively zoom positions assumed when a variable power lens unit is positioned at the respective ends of a range in which the variable power lens unit is movable along the optical axis under mechanical restrictions.

In each exemplary embodiment, an aperture stop SP is provided between the second lens unit L2 and the third lens unit L3. The opening size of the aperture stop SP may be fixed or varied during zooming. When the diameter of the aperture stop SP is varied, the upper coma flare caused by the off-axis optical flux greatly generated at the wide-angle end can be cut as much as possible. Therefore, higher optical performance can be obtained.

A mechanical stop (flare-cut stop) FP with fixed opening size is installed between the first lens unit L1 and the second lens unit L2. The mechanical stop FP can cut the light which degrades the optical performance. By setting the diameter of the mechanical stop FP to the largest possible size for not interrupting the axial light at the telephoto end, the upper coma flare by the off-axis ray in the entire zoom range can be cut as much as possible.

The first to fourth exemplary embodiments employ the rear focus system for the fourth lens unit L4 to focus on the object by moving on the optical axis. When the fourth lens unit L4 focuses from an infinitely-distant object to a close object at the telephoto end, the fourth lens unit L4 is moved toward the object side as indicated by the arrow 4c in the lens cross-sectional view. A curved line 4a in the figure indicates the moving locus for correcting variation of an image plane caused by zooming from the wide-angle end to the telephoto end when the fourth lens unit L4 is focusing on the infinitely-distant object. A curved line 4b indicates the moving locus for correcting variation of an image plane caused by zooming from the wide-angle end to the telephoto end when the fourth lens unit L4 is focusing on the close object.

In the fifth exemplary embodiment (FIG. 9), the third lens unit L3 focuses on the object by moving along the optical axis with a predetermined locus. When the third lens unit L3 focuses from an infinitely-distant object to a nearby object at the telephoto end, the third lens unit L3 is moved toward the image side as indicated by the arrow 3c in the lens cross-sectional view. A curved line 3a in the figure indicates the moving locus for correcting variation of an image plane caused by zooming from the wide-angle end to the telephoto end when the third lens unit L3 is focusing on the infinitely-distant object. A curved line 3b indicates the moving locus for correcting variation of an image plane caused by zooming from the wide-angle end to the telephoto end when the third lens unit L3 is focusing on a nearby object.

The focal lengths of the first lens unit L1, the second lens unit L2, and the third lens unit L3 are denoted by f1, f2, and f3, respectively, and the amount of movement of the second lens unit L2 during zooming from the wide-angle end to the telephoto end is denoted by M2. The amount of movement here is a difference in position of each lens unit on the optical axis between a position at the wide-angle end and a position at the telephoto end and any position therebetween. The amount of movement is considered positive when a lens unit is first located at the object side at the telephoto end and then moves toward the image side as compared with the wide-angle end.

The lateral magnifications of the second lens unit L2 and the third lens unit L3 at the wide-angle end are denoted by $\beta 2w$ and $\beta 2w$, respectively, and the lateral magnifications of the second lens unit L2 and the third lens unit L3 at the telephoto end are denoted by $\beta 2t$ and $\beta 3t$, respectively. Here, with the above parameters, each exemplary embodiment satisfies the following conditions:

$$0.08 < |f1|/|f3| < 0.35 \tag{1}$$

$$0.10 < f2/M2 < 0.64 \tag{2}$$

$$1.80 < (\beta 2t/\beta 2w)/(\beta 3t/\beta 3w) < 3.70 \tag{3}$$

The condition (1) defines the ratio between the focal length f1 of the first lens unit L1 and the focal length f3 of the third lens unit L3. When the absolute value |f1| of the focal length f1 of the first lens unit L1 becomes excessively large to the point where the upper limit of the condition (1) is exceeded, curvature of field and astigmatism can still be corrected. However, the above state is not desirable because the aperture of the first lens unit L1 needs to be increased to realize a wide angle of view. When the absolute value |f1| of the focal length f1 of the first lens unit L1 becomes extremely small to the point that the lower limit of the condition (1) is exceeded, a wide angle of view may be still achieved. However, such state is not desirable because curvature of field and astigmatism cannot be satisfactorily corrected at the wide-angle end.

The condition (2) defines the ratio between the focal length f2 of the second lens unit L2 and the amount of movement of the second lens unit L2 during zooming. When the focal length f2 of the second lens unit L2 becomes longer and the amount of movement of the second lens unit L2 becomes smaller with the upper limit of the condition (2) exceeded, a high zoom ratio cannot be realized, which is not desirable. When the focal length f2 of the second lens unit L2 becomes shorter to the point that the lower limit of the condition (2) exceeded, spherical aberration and coma cannot be satisfactorily corrected, which is also not desirable. Accordingly, it is preferable to maintain condition (2) within the given range of values.

The condition (3) defines the ratio of the zooming load to the second lens unit L2 to the zooming load to the third lens unit L3. When the zooming ratio of the second lens unit L2 becomes larger with the upper limit of the condition (3) exceeded, the refractive power of the second lens unit L2 increases. This results in large spherical aberration and large coma, which are not desirable. When the zooming ratio of the third lens unit L3 becomes larger with the lower limit of the condition (3) exceeded, the refractive power of the third lens unit L3 increases. This results in large curvature of field, which is not desirable.

As described above, in each exemplary embodiment, the respective elements are appropriately set to satisfy the conditions (1), (2), and (3) at the same time. As a result, the zoom lens with a wide angle of view, a high zoom ratio, and high optical performance for the entire zooming range can be obtained. In the respective exemplary embodiments, ranges of the numerical values for the conditions (1), (2), and (3) can be modified and may be set as follows:

$$0.10 < |f1|/|f3| < 0.34 \tag{1a}$$

$$0.20 < f2/M2 < 0.63 \tag{2a}$$

$$2.40 < (\beta 2t/\beta 2w)/(\beta 3t/\beta 3w) < 3.65 \tag{3a}$$

In addition, although more restrictive in terms of required precision, the conditions (1), (2) and (3) may be more desirable to set ranges of the numerical values as follows:

$$0.12 < |f1|/|f3| < 0.33 \tag{1b}$$

$$0.30 < f2/M2 < 0.62 \tag{2b}$$

$$2.60 < (\beta 2t/\beta 2w)/(\beta 3t/\beta 3w) < 3.60 \tag{3b}$$

Further, in the respective exemplary embodiments, it is beneficial to satisfy one or more of the following conditions (4) to (8). Here, the focal lengths of the entire zoom lens at the wide-angle end and the telephoto end are denoted by fw and ft, respectively, the focal length of the fourth lens unit L4 is denoted by f4, and the thickness of the second lens unit L2 on the optical axis is denoted by T2. Here, the thickness of a lens unit on the optical axis is a distance from the object side surface to the image side surface of each lens unit. It is desirable that one or more of the following conditions be satisfied:

$$0.18 < T2/M2 < 0.34 \tag{4}$$

$$0.50 < |f3|/ft < 4.00 \tag{5}$$

$$2.00 < f4/fw < 8.00 \tag{6}$$

$$1.50 < f2/fw < 5.00 \tag{7}$$

$$3.00 < \beta 2t/\beta 2w < 6.00 \tag{8}$$

The condition (4) defines the ratio between the thickness of the second lens unit L2 on the optical axis and the amount of movement of the second lens unit L2. When the thickness of the second lens unit L2 on the optical axis becomes thicker with the upper limit of the condition (4) exceeded, the total lens length increases, which is not desirable. When the thickness of the second lens unit L2 on the optical axis becomes thinner with the lower limit of the condition (4) exceeded, this results in large spherical aberration, large coma, and large axial chromatic aberration at the telephoto end, while being advantageous for shortening the total lens length. Therefore, the state is not desirable.

The condition (5) defines the ratio between the focal length f3 of the third lens unit L3 and the focal length ft of the entire zoom lens at the telephoto end. When the absolute value |f3| of the focal length f3 of the third lens unit L3 becomes larger with the upper limit of the condition (5) exceeded, the focus sensitivity of the fourth lens unit L4 becomes smaller and the amount of movement of the fourth lens unit L4 from the infinity to the closest range at the time of focusing becomes larger. This results in larger variation of aberration caused by focusing, which is not desirable. When the absolute value |f3| of the focal length f3 of the third lens unit L3 becomes smaller with the lower limit of the condition (5) exceeded, the amount of movement of the third lens unit L3 becomes smaller, which is advantageous for shortening the total lens length. However, large curvature of field occurs, which is not desirable.

The condition (6) defines the ratio between the focal length f4 of the fourth lens unit L4 and the focal length fw of the entire zoom lens at the wide-angle end. When the focal length f4 of the fourth lens unit L4 becomes longer with the upper limit of the condition (6) exceeded, the refractive power of the fourth lens unit L4 decreases. This results in a larger amount of movement of the fourth lens unit L4 at the time of focusing, and accordingly increases the total lens length. Therefore, the state is not desirable. When the focal length f4 of the fourth lens unit L4 becomes shorter with the lower limit of the condition (6) exceeded, this results in large lateral chromatic aberration, large curvature of field, and large astigmatism, which are not desirable.

The condition (7) defines the ratio between the focal length f2 of the second lens unit L2 and the focal length fw of the entire zoom lens at the wide-angle end. When the focal length f2 of the second lens unit L2 becomes longer with the upper limit of the condition (7) exceeded, the amount of movement of the second lens unit L2 during zooming increases, which is not desirable. When the focal length f2 of the second lens unit L2 becomes shorter with the lower limit of the condition (7) exceeded, this results in large spherical aberration and large coma, which are not desirable.

The condition (8) defines the zooming ratio of the second lens unit L2. When the zooming ratio of the second lens unit L2 becomes larger with the upper limit of the condition (8) exceeded, the refractive power of the second lens unit L2 becomes too large. As a result, large curvature of field occurs, which is not desirable. When the zooming ratio of the second lens unit L2 becomes smaller with the lower limit of the condition (8) exceeded, the zooming ratio of the third lens unit L3 increases to realize a high zoom ratio. This results in large curvature of field in the third lens unit L3, which is not desirable.

Ranges of the numerical values for the conditions (4) to (8) can be set as follows:

$$0.19 < T2/M2 < 0.33 \tag{4a}$$

$$0.70 < |f3|/ft < 3.80 \tag{5a}$$

$$3.00 < f4/fw < 7.60 \tag{6a}$$

$$1.90 < f2/fw < 4.20 \tag{7a}$$

$$3.30 < \beta 2t/\beta 2w < 5.50 \tag{8a}$$

More desirably, when ranges of the numerical values for the conditions (4) to (8) are set as follows, effects of the respective conditions can be increased to the maximum.

$$0.21 < T2/M2 < 0.32 \tag{4b}$$

$$0.90 < |f3|/ft < 3.60 \tag{5b}$$

$$4.00 < f4/fw < 7.20 \tag{6b}$$

$$2.30 < f2/fw < 3.40 \tag{7b}$$

$$3.60 < \beta 2t/\beta 2w < 5.00 \tag{8b}$$

When the respective elements are set in each exemplary embodiment as described above, the zoom lens with a wide angle of view, a high zoom ratio, and high optical performance for the entire zooming range can be obtained. When a plurality of the above-described conditions is combined, the effect of the present invention can be further enhanced.

Now, the lens configuration of each exemplary embodiment will be described. Unless otherwise specified, the respective lenses are provided from the object side to the image side in order.

The first lens unit L1 includes two lenses, i.e., a negative lens 11 and a positive lens 12 which is a meniscus with a concave surface at the image side. By adapting the negative lens 11 to be aspherical at the object side and the image side, astigmatism and curvature of field can be satisfactorily corrected. By adapting the positive lens 12 to be a meniscus with a concave surface at the image side to decrease the refractive power relative to an off-axis principal ray, the occurrence of astigmatism is suppressed. By forming the first lens unit L1 of two lenses as described above, the total lens length can be shortened.

The second lens unit L2 includes four lenses, i.e., a positive lens 21 with a convex surface at the object side, a positive lens 22 with a convex surface at the object side, a negative lens 23 with a concave surface at the image side, and a positive lens 24 with a convex surface at the image side.

The axial light ray is subjected to diffusion while passing through the first lens unit L1. Since the axial light ray passes through the second lens unit L2 at the position farthest from the optical axis, large spherical aberration occurs while the axial light ray is passing through the second lens unit L2. To address the problem, the second lens unit L2 is adapted to share the positive refractive power with the three positive lenses to decrease the refractive power relative to the axial light ray, suppressing the occurrence of spherical aberration.

Further, by adapting the positive lens 21 to be aspherical at the object side and the image side, spherical aberration and coma can be satisfactorily corrected. In the first to fourth exemplary embodiments, by adapting the positive lens 24 to be aspherical also at the image side, spherical aberration and coma can be satisfactorily corrected. Further, by combining the positive lens 22 and the negative lens 23 into a cemented lens, axial chromatic aberration can be satisfactorily corrected.

The third lens unit L3 includes a single negative lens 31. By appropriately setting the refractive power of the negative lens 31, the occurrence of curvature of field and astigmatism can be suppressed, while the zooming load is provided for the third lens unit L3. When the zooming load to the second lens unit L2 decreases, the amount of movement of the second lens unit L2 can be decreased, which can shorten the total lens length. In the fifth exemplary embodiment, by adapting the negative lens 31 to be aspherical at the image side, curvature of field and astigmatism can be satisfactorily corrected.

The fourth lens unit L4 includes a single positive lens 41. By adapting the positive lens 41 to be aspherical at the image side, curvature of field and astigmatism can be satisfactorily corrected.

Although exemplary embodiments of the present invention have been described, the present invention is not limited to these exemplary embodiments, and various modifications and alterations are possible within the spirit of the present invention.

Numerical examples 1 to 5 corresponding to the first to fifth exemplary embodiments of the present invention will be provided below. In each numerical example, i denotes the order of an optical surface from the object side. Also, ri denotes the radius of curvature of the i-th optical surface (i-th surface), di denotes a distance between the i-th surface and the (i+1)th surface, ndi and νdi denote the refractive index and the Abbe number of the material of the i-th optical member at the d-line, respectively.

Further, when k is an eccentricity, A4, A6, A8, A10 are aspheric coefficients, x is the displacement in the optical axis direction at the position of the height h from the optical axis based on the surface vertex, the aspherical shape is expressed by:

$$x = (h^2/R)/[1+\{1-(1+k)(h/R)^2\}^{1/2}] + A4h^4 + A6h^6 + A8h^8 + A10h^{10}$$

In the above expression, R represents a paraxial radius of curvature. Correspondence relations between the respective numerical examples and the above-described conditions will be provided in Table 1.

Numerical Example 1

Unit: mm

Surface data

| Surface number | r | d | nd | νd |
|---|---|---|---|---|
| 1* | −2940.699 | 0.70 | 1.85135 | 40.1 |
| 2* | 4.543 | 2.54 | | |
| 3 | 10.119 | 1.43 | 2.14352 | 17.8 |
| 4 | 18.277 | (variable) | | |
| 5 | ∞ | −0.30 | | |
| 6* | 6.746 | 1.77 | 1.83441 | 37.3 |
| 7* | −557.913 | 0.20 | | |
| 8 | 7.155 | 0.89 | 1.49700 | 81.5 |
| 9 | 24.219 | 0.40 | 1.92286 | 20.9 |
| 10 | 4.892 | 0.99 | | |
| 11 | −30.288 | 1.02 | 1.55332 | 71.7 |
| 12* | −5.890 | 0.50 | | |
| 13(stop) | ∞ | (variable) | | |
| 14 | 23.136 | 0.70 | 1.48749 | 70.2 |
| 15 | 11.048 | (variable) | | |
| 16 | 19.158 | 1.68 | 1.58313 | 59.4 |
| 17* | −22.200 | (variable) | | |
| 18 | ∞ | 0.80 | 1.51633 | 64.1 |
| 19 | ∞ | 0.30 | | |
| Image plane | ∞ | | | |

Aspheric surface data

First surface

K = 1.51338e+005   A4 = −1.33516e−004   A6 = 3.51307e−006
A8 = −5.01105e−008   A10 = 2.20144e−010
Second surface K = −1.72475e+000   A4 = 9.94393e−004   A6 = −1.46006e−005
A8 = 3.45252e−007   A10 = −6.58326e−009
Sixth surface K = −2.55243e−001   A4 = −2.33933e−004   A6 = −1.78897e−005
A8 = 1.09226e−006   A10 = −2.27316e−007
Seventh surface K = 1.82259e+004   A4 = 4.90919e−004   A6 = −1.22588e−005
A8 = 2.72619e−007   A10 = −2.89005e−007

-continued

Unit: mm

Twelfth surface

K = 1.31694e−001   A4 = −6.89502e−005   A6 = −3.61680e−005
A8 = 7.53195e−007   A10 = 1.75191e−007
Seventeenth surface K = 6.83058e+000   A4 = 6.15048e−004   A6 = −3.47958e−005
A8 = 1.53231e−006   A10 = −2.54684e−008

Various data
Zoom ratio 5.68

| | Wide-angle | Middle | Telephoto |
|---|---|---|---|
| Focal length | 3.31 | 11.16 | 18.80 |
| F-number | 2.88 | 4.48 | 6.08 |
| Angle of view | 44.91 | 19.14 | 11.65 |
| Image height | 3.30 | 3.88 | 3.88 |
| Total lens length | 35.50 | 31.12 | 39.51 |
| BF (back focus) | 4.72 | 4.71 | 3.49 |
| d4 | 16.15 | 1.98 | 0.58 |
| d13 | 0.62 | 8.44 | 6.39 |
| d15 | 1.50 | 3.48 | 16.52 |
| d17 | 3.89 | 3.88 | 2.66 |

Zoom lens unit data

| Unit | Start surface | Focal length |
|---|---|---|
| 1 | 1 | −8.77 |
| 2 | 6 | 9.11 |
| 3 | 14 | −44.21 |
| 4 | 16 | 17.90 |

Numerical Example 2

Unit: mm

Surface data

| Surface number | r | d | nd | νd |
|---|---|---|---|---|
| 1* | −1031.421 | 0.70 | 1.85135 | 40.1 |
| 2* | 4.943 | 2.17 | | |
| 3 | 9.939 | 1.36 | 2.14352 | 17.8 |
| 4 | 17.376 | (variable) | | |
| 5 | ∞ | −0.30 | | |
| 6* | 6.799 | 1.55 | 1.83441 | 37.3 |
| 7* | −453.322 | 0.20 | | |
| 8 | 7.637 | 0.79 | 1.49700 | 81.5 |
| 9 | 22.491 | 0.40 | 1.92286 | 20.9 |
| 10 | 5.112 | 1.39 | | |
| 11 | −27.962 | 1.08 | 1.55332 | 71.7 |
| 12* | −5.989 | 0.50 | | |
| 13(stop) | ∞ | (variable) | | |
| 14 | 28.990 | 0.70 | 1.48749 | 70.2 |
| 15 | 9.610 | (variable) | | |
| 16 | 18.286 | 1.60 | 1.58313 | 59.4 |
| 17* | −27.971 | (variable) | | |
| 18 | ∞ | 0.80 | 1.51633 | 64.1 |
| 19 | ∞ | 0.15 | | |
| Image plane | ∞ | | | |

Aspheric surface data

First surface

K = 1.09450e+004   A4 = −1.78649e−004   A6 = 4.76695e−006
A8 = −5.81082e−008   A10 = 1.63519e−010
Second surface K = −1.66170e+000   A4 = 6.90500e−004   A6 = −8.94445e−006
A8 = 3.79940e−007   A10 = −7.88288e−009

Unit: mm

Sixth surface

K = −1.58905e−001   A4 = −1.80379e−004   A6 = −1.24607e−005
A8 = 2.12461e−006   A10 = −2.53426e−007

Seventh surface

K = −5.62061e+003   A4 = 5.47945e−004   A6 = −2.95637e−006
A8 = 1.50545e−006   A10 = −2.79103e−007

Twelfth surface

K = 2.65453e−001    A4 = 2.07077e−005   A6 = −1.71189e−005
A8 = −2.30352e−007  A10 = −2.07492e−008

Seventeenth surface

K = 7.54993e+000    A4 = 4.81429e−004   A6 = −2.33259e−005
A8 = 8.92141e−007   A10 = −1.64612e−008

Various data
Zoom ratio 6.64

|  | Wide-angle | Middle | Telephoto |
|---|---|---|---|
| Focal length | 3.69 | 13.34 | 24.50 |
| F-number | 2.88 | 4.48 | 6.08 |
| Angle of view | 41.80 | 16.20 | 8.99 |
| Image height | 3.30 | 3.88 | 3.88 |
| Total lens length | 36.89 | 31.75 | 41.08 |
| BF | 5.62 | 5.20 | 2.50 |
| d4 | 17.30 | 1.66 | 0.50 |
| d13 | 0.83 | 11.20 | 10.16 |
| d15 | 1.01 | 1.55 | 15.79 |
| d17 | 4.94 | 4.52 | 1.82 |

Zoom lens unit data

| Unit | Start surface | Focal length |
|---|---|---|
| 1 | 1 | −9.44 |
| 2 | 6 | 9.36 |
| 3 | 14 | −29.84 |
| 4 | 16 | 19.21 |

Numerical Example 3

Unit: mm

Surface data

| Surface number | r | d | nd | vd |
|---|---|---|---|---|
| 1* | 2195.565 | 0.70 | 1.85135 | 40.1 |
| 2* | 5.129 | 2.01 | | |
| 3 | 9.479 | 1.33 | 2.14352 | 17.8 |
| 4 | 15.019 | (variable) | | |
| 5 | ∞ | −0.30 | | |
| 6* | 7.341 | 1.37 | 1.83441 | 37.3 |
| 7* | −382.789 | 0.20 | | |
| 8 | 7.941 | 0.91 | 1.49700 | 81.5 |
| 9 | 22.097 | 0.40 | 1.92286 | 20.9 |
| 10 | 5.617 | 1.42 | | |
| 11 | −30.078 | 1.43 | 1.55332 | 71.7 |
| 12* | −5.989 | 0.50 | | |
| 13(stop) | ∞ | (variable) | | |
| 14 | 22.993 | 0.70 | 1.48749 | 70.2 |
| 15 | 10.159 | (variable) | | |
| 16 | 21.763 | 1.19 | 1.58313 | 59.4 |
| 17* | −44.663 | (variable) | | |
| 18 | ∞ | 0.80 | 1.51633 | 64.1 |
| 19 | ∞ | 0.15 | | |
| Image plane | ∞ | | | |

Unit: mm

Aspheric surface data

First surface

K = 8.03100e+004    A4 = −1.64963e−004   A6 = 5.00002e−006
A8 = −6.26357e−008  A10 = 1.54605e−010

Second surface

K = −1.61511e+000   A4 = 6.44909e−004   A6 = −5.47708e−006
A8 = 3.80485e−007   A10 = −8.85160e−009

Sixth surface

K = −8.89237e−002   A4 = −1.09972e−004   A6 = −1.34016e−005
A8 = 4.05189e−006   A10 = −2.42490e−007

Seventh surface

K = −4.30380e+003   A4 = 5.56288e−004   A6 = 4.31269e−006
A8 = 3.57881e−006   A10 = −2.67015e−007

Twelfth surface

K = 1.69193e−001    A4 = 7.82251e−005   A6 = −1.43132e−005
A8 = −4.72279e−009  A10 = −1.41239e−008

Seventeenth surface

K = 3.40482e+000    A4 = 6.61804e−004   A6 = −4.58632e−005
A8 = 2.01709e−006   A10 = −3.53515e−008

Various data
Zoom ratio 7.59

|  | Wide-angle | Middle | Telephoto |
|---|---|---|---|
| Focal length | 3.69 | 14.53 | 28.00 |
| F-number | 2.88 | 4.48 | 6.08 |
| Angle of view | 41.80 | 14.93 | 7.88 |
| Image height | 3.30 | 3.88 | 3.88 |
| Total lens length | 37.20 | 32.32 | 42.69 |
| BF | 5.54 | 4.89 | 1.19 |
| d4 | 17.69 | 1.51 | 0.57 |
| d13 | 1.15 | 11.72 | 9.25 |
| d15 | 0.77 | 2.15 | 19.63 |
| d17 | 4.87 | 4.22 | 0.51 |

Zoom lens unit data

| Unit | Start surface | Focal length |
|---|---|---|
| 1 | 1 | −9.37 |
| 2 | 6 | 9.23 |
| 3 | 14 | −29.45 |
| 4 | 16 | 20.90 |

Numerical Example 4

Unit: mm

Surface data

| Surface number | r | d | nd | vd |
|---|---|---|---|---|
| 1* | −1608.768 | 0.70 | 1.85135 | 40.1 |
| 2* | 4.359 | 2.70 | | |
| 3 | 10.245 | 1.65 | 2.14352 | 17.8 |
| 4 | 18.593 | (variable) | | |
| 5 | ∞ | −0.30 | | |
| 6* | 6.746 | 1.82 | 1.83441 | 37.3 |
| 7* | −1172.466 | 0.20 | | |
| 8 | 7.147 | 0.85 | 1.49700 | 81.5 |
| 9 | 22.087 | 0.40 | 1.92286 | 20.9 |
| 10 | 4.879 | 0.93 | | |
| 11 | −31.266 | 1.21 | 1.55332 | 71.7 |
| 12* | −5.890 | 0.50 | | |
| 13(stop) | ∞ | (variable) | | |

-continued

Unit: mm

| | | | | |
|---|---|---|---|---|
| 14 | 19.517 | 0.70 | 1.48749 | 70.2 |
| 15 | 11.527 | (variable) | | |
| 16 | 18.771 | 1.52 | 1.58313 | 59.4 |
| 17* | −19.030 | (variable) | | |
| 18 | ∞ | 0.80 | 1.51633 | 64.1 |
| 19 | ∞ | 0.30 | | |
| Image plane | ∞ | | | |

Aspheric surface data

First surface

K = 3.86437e+004    A4 = −1.33554e−004    A6 = 3.44942e−006
A8 = −4.47109e−008    A10 = 1.96455e−010

Second surface

K = −1.69812e+000    A4 = 1.02927e−003    A6 = −1.96651e−005
A8 = 4.59765e−007    A10 = −6.47461e−009

Sixth surface

K = −4.62797e−001    A4 = −2.35353e−004    A6 = −2.00046e−005
A8 = 8.72034e−007    A10 = −2.05809e−007

Seventh surface

K = −4.36581e+004    A4 = 3.56471e−004    A6 = −1.23589e−005
A8 = 1.47315e−008    A10 = −2.78856e−007

Twelfth surface

K = −4.99141e−002    A4 = −1.25999e−004    A6 = −3.96474e−005
A8 = 2.04194e−007    A10 = 5.54155e−009

Seventeenth surface

K = −1.18736e+001    A4 = 7.37770e−004    A6 = −4.66081e−005
A8 = 1.39960e−006    A10 = −1.10818e−008

Various data
Zoom ratio 5.68

| | Wide-angle | Middle | Telephoto |
|---|---|---|---|
| Focal length | 2.99 | 10.41 | 16.99 |
| F-number | 2.88 | 4.48 | 6.08 |
| Angle of view | 47.82 | 20.42 | 12.85 |
| Image height | 3.30 | 3.88 | 3.88 |
| Total lens length | 35.71 | 31.87 | 40.87 |
| BF | 4.23 | 3.62 | 2.38 |
| d4 | 16.19 | 2.23 | 1.11 |
| d13 | 0.98 | 7.41 | 0.88 |
| d15 | 1.43 | 5.72 | 23.61 |
| d17 | 3.40 | 2.79 | 1.56 |

Zoom lens unit data

| Unit | Start surface | Focal length |
|---|---|---|
| 1 | 1 | −8.30 |
| 2 | 6 | 9.11 |
| 3 | 14 | −59.47 |
| 4 | 16 | 16.45 |

Numerical Example 5

Unit: mm

Surface data

| Surface number | r | d | nd | vd |
|---|---|---|---|---|
| 1* | 7931.707 | 0.70 | 1.85135 | 40.1 |
| 2* | 4.748 | 2.40 | | |
| 3 | 10.263 | 1.84 | 2.00272 | 19.3 |
| 4 | 22.750 | (variable) | | |
| 5 | ∞ | −0.30 | | |

-continued

Unit: mm

| | | | | |
|---|---|---|---|---|
| 6* | 5.976 | 1.04 | 1.83441 | 37.3 |
| 7* | −520.452 | 0.20 | | |
| 8 | 8.017 | 0.99 | 1.48749 | 70.2 |
| 9 | 21.895 | 0.40 | 1.92286 | 20.9 |
| 10 | 4.666 | 1.10 | | |
| 11 | −48.434 | 1.17 | 1.49700 | 81.6 |
| 12 | −6.327 | 0.50 | | |
| 13(stop) | ∞ | (variable) | | |
| 14 | 20.015 | 0.70 | 1.55332 | 71.7 |
| 15* | 9.415 | (variable) | | |
| 16 | 41.575 | 1.70 | 1.69350 | 53.2 |
| 17* | −16.392 | (variable) | | |
| 18 | ∞ | 0.80 | 1.51633 | 64.1 |
| 19 | ∞ | 0.37 | | |
| Image plane | ∞ | | | |

Aspheric surface data

First surface

K = −2.66164e+008    A4 = −1.46064e−004    A6 = 2.06002e−006
A8 = −2.40403e−008    A10 = 8.95462e−011

Second surface

K = −1.66859e+000    A4 = 8.20033e−004    A6 = −1.36456e−005
A8 = 2.16098e−007    A10 = −2.91151e−009

Sixth surface

K = −1.58098e−001    A4 = −1.99139e−004    A6 = −1.27164e−005
A8 = 5.10984e−007    A10 = −2.37163e−007

Seventh surface

K = 2.64628e+004    A4 = 5.29524e−004    A6 = −4.85648e−006
A8 = −2.01550e−006    A10 = −4.68416e−008

The fifteenth surface

K = 9.30130e−001    A4 = −7.71205e−005    A6 = 1.15354e−005
A8 = 1.65565e−007    A10 = −4.80658e−008

Seventeenth surface

K = 1.15001e+000    A4 = 3.64953e−004    A6 = −1.87223e−005
A8 = 4.07414e−007    A10 = −2.90444e−009

Various data
Zoom ratio 4.74

| | Wide-angle | Middle | Telephoto |
|---|---|---|---|
| Focal length | 3.69 | 11.00 | 17.48 |
| F-number | 2.64 | 4.28 | 6.06 |
| Angle of view | 41.81 | 19.41 | 12.50 |
| Image height | 3.30 | 3.88 | 3.88 |
| Total lens length | 36.49 | 30.17 | 36.18 |
| BF | 4.60 | 4.60 | 4.60 |
| d4 | 16.76 | 2.55 | 0.66 |
| d13 | 1.13 | 7.81 | 7.60 |
| d15 | 1.57 | 2.79 | 10.89 |
| d17 | 3.70 | 3.70 | 3.70 |

Zoom lens unit data

| Unit | Start surface | Focal length |
|---|---|---|
| 1 | 1 | −9.61 |
| 2 | 6 | 9.21 |
| 3 | 14 | −32.90 |
| 4 | 16 | 17.16 |

TABLE 1

| | Numerical Examples | | | | |
|---|---|---|---|---|---|
| Conditions | 1 | 2 | 3 | 4 | 5 |
| (1) | 0.20 | 0.32 | 0.25 | 0.14 | 0.29 |
| (2) | 0.47 | 0.45 | 0.42 | 0.45 | 0.58 |

TABLE 1-continued

| Conditions | Numerical Examples | | | | |
|---|---|---|---|---|---|
| | 1 | 2 | 3 | 4 | 5 |
| (3) | 3.37 | 3.54 | 3.37 | 2.98 | 3.43 |
| (4) | 0.27 | 0.26 | 0.26 | 0.27 | 0.31 |
| (5) | 2.35 | 1.22 | 1.36 | 3.50 | 1.88 |
| (6) | 5.41 | 5.20 | 6.84 | 5.50 | 4.65 |
| (7) | 2.75 | 2.54 | 2.51 | 3.05 | 2.50 |
| (8) | 4.18 | 4.35 | 4.38 | 3.83 | 3.87 |

The image pickup apparatus according to an exemplary embodiment of the present invention may include a circuit for electrically correcting either or both of distortion and lateral chromatic aberration together with any of the above-described zoom lenses. With the configuration capable of allowing for distortion and the like of the zoom lens, the number of lenses in the entire zoom lens can be reduced and the image pickup apparatus is easily downsized. Further, by electrically correcting lateral chromatic aberration, color bleeding of a picked up image can be reduced and the resolution of the image can be easily improved.

Now, an exemplary embodiment of a digital still camera using the zoom lens according to an exemplary embodiment of the present invention as a photographic optical system will be described with reference to FIG. 11. FIG. 11 illustrates a camera body 50 and a photographic optical system 51 which includes any of the zoom lenses described in the first to fifth exemplary embodiments. A solid-state image sensor (photoelectric conversion element) 52 such as a CCD sensor or a CMOS sensor receives an object image formed by the photographic optical system 51. A viewfinder 54 is used to observe the object image formed on the solid-state image sensor 52. By applying the zoom lens according to the exemplary embodiments of the present invention to an image pickup apparatus such as a digital still camera, an image pickup apparatus with a wide angle of view, a high zoom ratio, and high optical performance can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-165635 filed Jul. 26, 2012, which is hereby incorporated by reference herein in its entirety.

What is claimed is:

1. A zoom lens comprising, in order from an object side to an image side:
 a first lens unit having negative refractive power;
 a second lens unit having positive refractive power;
 a third lens unit having negative refractive power; and
 a fourth lens unit having positive refractive power,
 wherein at least the first lens unit, the second lens unit, and the third lens unit move during zooming, and
 wherein, when a focal length of the first lens unit is denoted by f1, a focal length of the second lens unit is denoted by f2, a focal length of the third lens unit is denoted by f3, an amount of movement of the second lens unit during zooming from a wide-angle end to a telephoto end is denoted by M2, a lateral magnification at the wide-angle end of the second lens unit is denoted by $\beta 2w$, a lateral magnification at the wide-angle end of the third lens unit is denoted by $\beta 3w$, a lateral magnification at the telephoto end of the second lens unit is denoted by $\beta 2t$, and a lateral magnification at the telephoto end of the third lens unit is denoted by $\beta 3t$, the following conditions are satisfied:

$$0.08 < |f1|/|f3| < 0.35$$

$$0.10 < f2/M2 < 0.64$$

$$1.80 < (\beta t/\beta 2w)/(\beta 3t/\beta 3w) < 3.70.$$

2. The zoom lens according to claim 1, wherein, when a thickness of the second lens unit on an optical axis is denoted by T2, the following condition is satisfied:

$$0.18 < T2/M2 < 0.34.$$

3. The zoom lens according to claim 1, wherein, when a focal length of the entire zoom lens at the telephoto end is denoted by ft, the following condition is satisfied:

$$0.50 < |f3|/ft < 4.00.$$

4. The zoom lens according to claim 1, wherein, when a focal length of the fourth lens unit is denoted by f4 and a focal length of the entire zoom lens at the wide-angle end is denoted by fw, the following condition is satisfied:

$$2.00 < f4/fw < 8.00.$$

5. The zoom lens according to claim 1, wherein, when a focal length of the entire zoom lens at the wide-angle end is denoted by fw, the following condition is satisfied:

$$1.50 < f2/fw < 5.00.$$

6. The zoom lens according to claim 1, wherein the following condition is satisfied:

$$3.00 < \beta 2t\beta 2w < 6.00.$$

7. The zoom lens according to claim 1, wherein the third lens unit includes a single lens having negative refractive power.

8. The zoom lens according to claim 1, wherein the fourth lens unit includes a single lens having positive refractive power.

9. The zoom lens according to claim 1, wherein the second lens unit includes at least three lenses having positive refractive power.

10. The zoom lens according to claim 1, wherein the fourth lens unit moves during zooming.

11. An image pickup apparatus comprising:
 a zoom lens; and
 an image sensor configured to receive an image formed by the zoom lens,
 wherein the zoom lens includes, in order from an object side to an image side, a first lens unit having negative refractive power, a second lens unit having positive refractive power, a third lens unit having negative refractive power, and a fourth lens unit having positive refractive power, and
 wherein at least the first lens unit, the second lens unit, and the third lens unit move during zooming, and
 wherein, when a focal length of the first lens unit is denoted by f1, a focal length of the second lens unit is denoted by f2, a focal length of the third lens unit is denoted by f3, an amount of movement of the second lens unit during zooming from a wide-angle end to a telephoto end is denoted by M2, a lateral magnification at the wide-angle end of the second lens unit is denoted by $\beta 2w$, a lateral magnification at the wide-angle end of the third lens unit is denoted by $\beta 3w$, a lateral magnification at the telephoto end of the second lens unit is denoted by $\beta 2t$, and a lateral magnification at the telephoto end of the third lens unit is denoted by $\beta 3t$, the following conditions are satisfied:

$$0.08 < |f1|/|f3| < 0.35$$

$$0.10 < f2/M2 < 0.64$$

$$1.80 < (\beta 2t/\beta 2w)/(\beta 3t/\beta 3w) < 3.70.$$

* * * * *